United States Patent
Gilley

(10) Patent No.: US 12,154,594 B2
(45) Date of Patent: Nov. 26, 2024

(54) DISTRIBUTED SCALABLE MEDIA ENVIRONMENT FOR ADVERTISING PLACEMENT IN MOVIES

(71) Applicant: CrowdStrike, Inc., Sunnyvale, CA (US)

(72) Inventor: Thomas S. Gilley, New York, NY (US)

(73) Assignee: CrowdStrike, Inc., Sunnyvale, CA (US)

(*) Notice: Subject to any disclaimer, the term of this patent is extended or adjusted under 35 U.S.C. 154(b) by 0 days.

(21) Appl. No.: 17/196,087

(22) Filed: Mar. 9, 2021

(65) Prior Publication Data

US 2021/0193182 A1 Jun. 24, 2021

Related U.S. Application Data

(63) Continuation of application No. 15/495,041, filed on Apr. 24, 2017, now Pat. No. 10,950,273, which is a
(Continued)

(51) Int. Cl.
*G06Q 30/02* (2023.01)
*G06Q 30/0241* (2023.01)
(Continued)

(52) U.S. Cl.
CPC ........... *G11B 27/034* (2013.01); *G06Q 30/02* (2013.01); *G06Q 30/0273* (2013.01);
(Continued)

(58) Field of Classification Search
CPC ........... G06Q 30/0273; G06Q 30/0277; H04N 21/812
See application file for complete search history.

(56) References Cited

U.S. PATENT DOCUMENTS 3,143,705 A  8/1964  Currey et al.
3,192,313 A  6/1965  Rubinstein et al.
(Continued)

FOREIGN PATENT DOCUMENTS

EP  0526064 A2  2/1993
EP  1513151 A1  3/2005
(Continued)

OTHER PUBLICATIONS

Office Action issued for U.S. Appl. No. 17/010,731 dated Sep. 2, 2021, 13 pages.
(Continued)

*Primary Examiner* — Christopher Stroud
(74) *Attorney, Agent, or Firm* — Womble Bond Dickinson (US) LLP

(57) ABSTRACT

A method of placing an ad in a video in an original format may include producing a transcoded video in a proxy format which is a representation of frames of the video in the original format. The transcoded video in the proxy format is convertible to other formats for output. The method may include selecting the ad from a set of ads, selecting a location within a frame of the transcoded video where the ad is to be placed, selecting frames of the transcoded video where the ad is to be placed, placing a placeholder in the transcoded video in the selected frames at the selected location, and storing the transcoded video in the proxy format. When the transcoded video is presented to a user on a display device, the selected ad is inserted in place of the placeholder.

20 Claims, 16 Drawing Sheets

Related U.S. Application Data continuation of application No. 13/011,002, filed on Jan. 21, 2011, now Pat. No. 9,934,819, which is a continuation of application No. 11/439,593, filed on May 23, 2006, now Pat. No. 7,877,689.

(60) Provisional application No. 60/683,662, filed on May 23, 2005.

(51) Int. Cl.

| | |
|---|---|
| *G06Q 30/0273* | (2023.01) |
| *G11B 20/10* | (2006.01) |
| *G11B 27/031* | (2006.01) |
| *G11B 27/034* | (2006.01) |
| *G11B 27/036* | (2006.01) |
| *G11B 27/34* | (2006.01) |
| *H04N 5/262* | (2006.01) |
| *H04N 5/272* | (2006.01) |
| *H04N 5/76* | (2006.01) |
| *H04N 5/765* | (2006.01) |
| *H04N 5/77* | (2006.01) |
| *H04N 5/93* | (2006.01) |
| *H04N 7/173* | (2011.01) |
| *H04N 21/2225* | (2011.01) |
| *H04N 21/234* | (2011.01) |
| *H04N 21/2343* | (2011.01) |
| *H04N 21/2543* | (2011.01) |
| *H04N 21/2547* | (2011.01) |
| *H04N 21/2743* | (2011.01) |
| *H04N 21/4143* | (2011.01) |
| *H04N 21/4223* | (2011.01) |
| *H04N 21/426* | (2011.01) |
| *H04N 21/4402* | (2011.01) |
| *H04N 21/472* | (2011.01) |
| *H04N 21/61* | (2011.01) |
| *H04N 21/81* | (2011.01) |
| *H04N 21/854* | (2011.01) |
| *H04N 5/775* | (2006.01) |

(52) U.S. Cl.
CPC ... *G06Q 30/0277* (2013.01); *G11B 20/10527* (2013.01); *G11B 27/031* (2013.01); *G11B 27/036* (2013.01); *G11B 27/34* (2013.01); *H04N 5/262* (2013.01); *H04N 5/272* (2013.01); *H04N 5/7605* (2013.01); *H04N 5/765* (2013.01); *H04N 5/77* (2013.01); *H04N 5/93* (2013.01); *H04N 7/17318* (2013.01); *H04N 21/2225* (2013.01); *H04N 21/23424* (2013.01); *H04N 21/2343* (2013.01); *H04N 21/234309* (2013.01); *H04N 21/2543* (2013.01); *H04N 21/2547* (2013.01); *H04N 21/2743* (2013.01); *H04N 21/4143* (2013.01); *H04N 21/4223* (2013.01); *H04N 21/42646* (2013.01); *H04N 21/4402* (2013.01); *H04N 21/440218* (2013.01); *H04N 21/47202* (2013.01); *H04N 21/6125* (2013.01); *H04N 21/812* (2013.01); *H04N 21/854* (2013.01); *G11B 2020/10537* (2013.01); *G11B 2220/2562* (2013.01); *H04N 5/772* (2013.01); *H04N 5/775* (2013.01); *Y10S 715/972* (2013.01)

(56) References Cited

U.S. PATENT DOCUMENTS

| | | | |
|---|---|---|---|
| 5,101,364 A | 3/1992 | Davenport | |
| 5,453,764 A | 9/1995 | Inagaki | |
| 5,577,191 A | 11/1996 | Bonomi | |
| 5,659,793 A * | 8/1997 | Escobar | H04L 9/40 715/202 |
| 5,708,845 A | 1/1998 | Wistendahl et al. | |
| 5,715,018 A * | 2/1998 | Fasciano | H04H 20/103 348/549 |
| 5,751,883 A | 5/1998 | Ottesen et al. | |
| 5,828,370 A | 10/1998 | Moeller et al. | |
| 5,880,722 A | 3/1999 | Brewer | |
| 5,886,692 A | 3/1999 | Brewer | |
| 6,005,678 A | 12/1999 | Higashida et al. | |
| 6,027,257 A | 2/2000 | Richards et al. | |
| 6,088,722 A | 7/2000 | Herz et al. | |
| 6,154,600 A | 11/2000 | Newman | |
| 6,157,771 A | 12/2000 | Brewer | |
| 6,173,317 B1 | 1/2001 | Chaddha et al. | |
| 6,181,883 B1 | 1/2001 | Oswal | |
| 6,192,183 B1 | 2/2001 | Taniguchi | |
| 6,201,925 B1 | 3/2001 | Brewer | |
| 6,262,777 B1 | 7/2001 | Brewer | |
| 6,263,150 B1 | 7/2001 | Okada | |
| 6,285,361 B1 | 9/2001 | Brewer | |
| 6,317,141 B1 | 11/2001 | Pavley et al. | |
| 6,317,147 B1 | 11/2001 | Tanaka | |
| 6,357,042 B2 | 3/2002 | Srinivasan et al. | |
| 6,400,886 B1 | 6/2002 | Brewer | |
| 6,414,686 B1 | 7/2002 | Protheroe | |
| 6,453,459 B1 | 9/2002 | Brodersen | |
| 6,493,872 B1 | 12/2002 | Rangan et al. | |
| 6,496,872 B1 | 12/2002 | Katz et al. | |
| 6,496,981 B1 | 12/2002 | Wistendahl et al. | |
| 6,504,990 B1 | 1/2003 | Abecassis | |
| 6,546,188 B1 | 4/2003 | Ishii et al. | |
| 6,580,437 B1 | 6/2003 | Liou et al. | |
| 6,587,119 B1 | 7/2003 | Anderson | |
| 6,597,375 B1 | 7/2003 | Yawitz | |
| 6,631,522 B1 | 10/2003 | Erdelyi | |
| 6,647,061 B1 | 11/2003 | Panusopone | |
| 6,661,430 B1 | 12/2003 | Brewer | |
| 6,698,020 B1 | 2/2004 | Zigmond et al. | |
| 6,710,785 B1 | 3/2004 | Asai | |
| 6,714,216 B2 | 3/2004 | Abe | |
| 6,774,908 B2 | 8/2004 | Bates et al. | |
| 6,973,130 B1 * | 12/2005 | Wee | G06T 9/20 375/E7.182 |
| 7,027,102 B2 | 4/2006 | Sacca | |
| 7,055,168 B1 | 5/2006 | Errico | |
| 7,158,676 B1 | 1/2007 | Rainsford | |
| 7,337,403 B2 | 2/2008 | Pavley et al. | |
| 7,421,729 B2 * | 9/2008 | Zenoni | H04N 21/23892 725/115 |
| 7,516,129 B2 | 4/2009 | Risberg et al. | |
| 7,559,017 B2 | 7/2009 | Datar | |
| 7,818,763 B2 | 10/2010 | Sie et al. | |
| 7,877,689 B2 | 1/2011 | Gilley | |
| 8,141,111 B2 | 3/2012 | Gilley | |
| 8,145,528 B2 | 3/2012 | Gilley | |
| 8,171,509 B1 | 5/2012 | Girouard et al. | |
| 8,260,656 B1 | 9/2012 | Harbick et al. | |
| 8,724,969 B2 | 5/2014 | Gilley | |
| 8,739,205 B2 | 5/2014 | Gilley et al. | |
| 8,755,673 B2 | 6/2014 | Gilley | |
| 8,949,899 B2 | 2/2015 | Errico et al. | |
| 9,330,723 B2 | 5/2016 | Gilley et al. | |
| 9,648,281 B2 | 5/2017 | Gilley et al. | |
| 9,653,120 B2 | 5/2017 | Gilley et al. | |
| 9,654,735 B2 | 5/2017 | Gilley et al. | |
| 9,934,819 B2 | 4/2018 | Gilley | |
| 9,940,971 B2 | 4/2018 | Gilley | |
| 9,947,365 B2 | 4/2018 | Gilley | |
| 10,090,019 B2 | 10/2018 | Gilley | |
| 10,192,587 B2 | 1/2019 | Gilley | |
| 10,491,935 B2 | 11/2019 | Gilley et al. | |
| 10,504,558 B2 | 12/2019 | Gilley | |
| 10,510,376 B2 | 12/2019 | Gilley | |
| 10,594,981 B2 | 3/2020 | Gilley et al. | |
| 10,650,863 B2 | 5/2020 | Gilley et al. | |
| 10,672,429 B2 | 6/2020 | Gilley et al. | |
| 10,789,986 B2 | 9/2020 | Gilley et al. | |

(56) References Cited

U.S. PATENT DOCUMENTS

| | | | |
|---|---|---|---|
| 10,796,722 | B2 | 10/2020 | Gilley |
| 10,863,224 | B2 | 12/2020 | Gilley |
| 10,950,273 | B2 | 3/2021 | Gilley |
| 10,958,876 | B2 | 3/2021 | Gilley |
| 11,153,614 | B2 | 10/2021 | Gilley et al. |
| 11,381,779 | B2 | 7/2022 | Gilley et al. |
| 11,589,087 | B2 | 2/2023 | Gilley et al. |
| 11,626,141 | B2 | 4/2023 | Gilley et al. |
| 11,706,388 | B2 | 7/2023 | Gilley et al. |
| 11,930,227 | B2 | 3/2024 | Gilley et al. |
| 2001/0023436 | A1* | 9/2001 | Srinivasan ............ H04N 21/435 375/E7.008 |
| 2002/0013948 | A1 | 1/2002 | Aguayo, Jr. et al. |
| 2002/0016961 | A1 | 2/2002 | Goode |
| 2002/0028060 | A1 | 3/2002 | Murata et al. |
| 2002/0053078 | A1 | 5/2002 | Holtz et al. |
| 2002/0063737 | A1 | 5/2002 | Feig et al. |
| 2002/0065678 | A1 | 5/2002 | Peliotis et al. |
| 2002/0069218 | A1 | 6/2002 | Sull et al. |
| 2002/0069405 | A1 | 6/2002 | Chapin |
| 2002/0073417 | A1 | 6/2002 | Kondo et al. |
| 2002/0100042 | A1 | 6/2002 | Khoo |
| 2002/0092019 | A1 | 7/2002 | Marcus |
| 2002/0112249 | A1 | 8/2002 | Hendricks |
| 2002/0131511 | A1* | 9/2002 | Zenoni ............ H04N 21/44016 348/521 |
| 2002/0144262 | A1 | 10/2002 | Plotnick |
| 2002/0144263 | A1 | 10/2002 | Eldering et al. |
| 2002/0145622 | A1* | 10/2002 | Kauffman ...... H04N 21/234363 348/E5.022 |
| 2002/0152117 | A1 | 10/2002 | Cristofalo |
| 2002/0156829 | A1 | 10/2002 | Yoshimine |
| 2002/0156842 | A1* | 10/2002 | Signes .................... H04L 67/51 348/E7.071 |
| 2003/0028873 | A1 | 2/2003 | Lemmons |
| 2003/0093790 | A1 | 5/2003 | Logan et al. |
| 2003/0093792 | A1 | 5/2003 | Labeeb et al. |
| 2003/0115552 | A1 | 6/2003 | Jahnke |
| 2003/0121058 | A1 | 6/2003 | Dimitrova et al. |
| 2003/0149975 | A1 | 8/2003 | Eldering et al. |
| 2003/0156824 | A1 | 8/2003 | Lu |
| 2003/0191816 | A1* | 10/2003 | Landress ................ G06Q 30/02 709/219 |
| 2003/0225641 | A1 | 12/2003 | Gritzmacher et al. |
| 2004/0008970 | A1 | 1/2004 | Junkersfeld |
| 2004/0021685 | A1 | 2/2004 | Denoue |
| 2004/0030599 | A1 | 2/2004 | Sie et al. |
| 2004/0096110 | A1* | 5/2004 | Yogeshwar ............. G06F 16/51 707/E17.031 |
| 2004/0103429 | A1 | 5/2004 | Carlucci et al. |
| 2004/0133909 | A1 | 6/2004 | Ma |
| 2004/0128317 | A1 | 7/2004 | Sull et al. |
| 2004/0131330 | A1 | 7/2004 | Wilkins et al. |
| 2004/0133924 | A1 | 7/2004 | Wilkins et al. |
| 2004/0139233 | A1 | 7/2004 | Kellerman et al. |
| 2004/0158858 | A1 | 8/2004 | Paxton et al. |
| 2004/0163101 | A1 | 8/2004 | Swix et al. |
| 2004/0187160 | A1 | 9/2004 | Cook et al. |
| 2004/0193488 | A1 | 9/2004 | Khoo |
| 2004/0194128 | A1 | 9/2004 | McIntyre et al. |
| 2004/0199923 | A1 | 10/2004 | Russek |
| 2004/0268223 | A1 | 12/2004 | Tojo |
| 2005/0058460 | A1* | 3/2005 | Wang .................... H04B 10/503 398/195 |
| 2005/0097599 | A1 | 5/2005 | Plotnick et al. |
| 2005/0137958 | A1 | 6/2005 | Huber |
| 2005/0154679 | A1 | 7/2005 | Bielak |
| 2005/0210145 | A1 | 9/2005 | Kim et al. |
| 2005/0220439 | A1 | 10/2005 | Carton et al. |
| 2005/0229231 | A1 | 10/2005 | Lippincott |
| 2005/0262539 | A1 | 11/2005 | Barton et al. |
| 2005/0283754 | A1 | 12/2005 | Vignet |
| 2006/0013554 | A1 | 1/2006 | Poslinski |
| 2006/0015904 | A1 | 1/2006 | Marcus |
| 2006/0020961 | A1 | 1/2006 | Chiu |
| 2006/0026655 | A1 | 2/2006 | Perez |
| 2006/0098941 | A1 | 5/2006 | Abe et al. |
| 2006/0120689 | A1 | 6/2006 | Baxter |
| 2006/0179453 | A1 | 8/2006 | Kadie et al. |
| 2006/0212897 | A1 | 9/2006 | Li et al. |
| 2006/0224940 | A1* | 10/2006 | Lee ...................... G11B 27/034 |
| 2006/0239648 | A1 | 10/2006 | Varghese |
| 2006/0248558 | A1 | 11/2006 | Barton |
| 2006/0267995 | A1 | 11/2006 | Radloff et al. |
| 2007/0124762 | A1 | 5/2007 | Chickering et al. |
| 2007/0157228 | A1 | 7/2007 | Bayer et al. |
| 2007/0157242 | A1 | 7/2007 | Cordray et al. |
| 2008/0212937 | A1 | 9/2008 | Son |
| 2008/0219638 | A1 | 9/2008 | Haot et al. |
| 2009/0077580 | A1 | 3/2009 | Konig et al. |
| 2009/0262749 | A1 | 10/2009 | Graumann et al. |
| 2011/0116760 | A1 | 5/2011 | Gilley |
| 2012/0251083 | A1 | 10/2012 | Svendsen et al. |
| 2014/0212109 | A1 | 7/2014 | Gilley |
| 2014/0212111 | A1 | 7/2014 | Gilley |
| 2016/0099024 | A1 | 4/2016 | Gilley |
| 2017/0084308 | A1 | 3/2017 | Gilley et al. |
| 2017/0180771 | A1 | 6/2017 | Gilley et al. |
| 2017/0223391 | A1 | 8/2017 | Gilley et al. |
| 2017/0229148 | A1 | 8/2017 | Gilley et al. |
| 2018/0158486 | A1 | 6/2018 | Gilley |
| 2018/0204598 | A1 | 7/2018 | Gilley |
| 2018/0366161 | A1 | 12/2018 | Gilley |
| 2019/0122701 | A1 | 4/2019 | Gilley et al. |
| 2020/0037016 | A1 | 1/2020 | Gilley et al. |
| 2020/0111509 | A1 | 4/2020 | Gilley et al. |
| 2020/0118592 | A1 | 4/2020 | Gilley et al. |
| 2020/0154079 | A1 | 5/2020 | Gilley et al. |
| 2020/0251147 | A1 | 8/2020 | Gilley et al. |
| 2020/0402540 | A1 | 12/2020 | Gilley |
| 2020/0411057 | A1 | 12/2020 | Gilley |
| 2021/0058662 | A1 | 2/2021 | Gilley |
| 2021/0193182 | A1 | 6/2021 | Gilley et al. |
| 2021/0211610 | A1 | 7/2021 | Gilley et al. |
| 2022/0038759 | A1 | 2/2022 | Gilley et al. |
| 2022/0303504 | A1 | 9/2022 | Gilley |
| 2023/0197113 | A1 | 6/2023 | Gilley et al. |
| 2023/0199234 | A1 | 6/2023 | Gilley et al. |
| 2023/0319235 | A1 | 10/2023 | Gilley et al. |

FOREIGN PATENT DOCUMENTS

| | | |
|---|---|---|
| EP | 1667454 | 6/2006 |
| WO | WO9430008 A1 | 12/1994 |
| WO | WO9739411 | 10/1997 |
| WO | WO9806098 A1 | 2/1998 |
| WO | WO9926415 A1 | 5/1999 |
| WO | WO 00/14951 | 3/2000 |
| WO | WO0110127 A1 | 2/2001 |
| WO | WO03085633 A2 | 10/2003 |
| WO | WO2004104773 A2 | 12/2004 |
| WO | WO2005018233 | 2/2005 |

OTHER PUBLICATIONS

Office Action issued for U.S. Appl. No. 17/021,479 dated Sep. 2, 2021, 13 pages.
Office Action issued for U.S. Appl. No. 17/093,727 dated Nov. 26, 2021, 23 pages.
Office Action issued for U.S. Appl. No. 17/209,101 dated Nov. 23, 2021, 11 pages.
Office Action issued for U.S. Appl. No. 16/854,739, dated Apr. 12, 2021, 8 pages.
Office Action issued for U.S. Appl. No. 17/093,727, dated May 25, 2021, 16 pages.
Karidis et al., A Collaborative Working Paradigm for Distributed High-End Audio-Visual Content Creation, IEEE Int'l Conference on Multimedia Computing and Systems, 1999, (vol. 2) Jun. 7-11, 1999, pp. 328-332, IEEE #0-7695-0253-9.
Distributed Video Production (DVP) project, EU ACTS Project (AC089), OFES 95.0493, Apr. 12, 1997, 7 pgs., Computer Vision

(56) References Cited

OTHER PUBLICATIONS

Group, Geneva, Switzerland, at http://cui.unige.ch/-vision/ResearchProjects/DVP/.
Rowe et al., The Berkeley Distributed Video-on-Demand System, 1996, 17 pgs., University of California, Berkley, CA, at http://bmrc.berkeley.edu/research/publications/1996/NEC95.html#intro.
Office Action for U.S. Appl. No. 11/592,901, dated Oct. 5, 2009, 13 pgs.
Office Action for U.S. Appl. No. 11/439,593 dated Dec. 29, 2009, 12 pgs.
Hurwicz et al., "Overview and Table of Contents", Special Edition Using Macromedia Flash MX, Aug. 15, 2002, Que Publishing, 5 pgs. at http://proquest.safaribooksonline.com/0-7897-2762-5.
Office Action for U.S. Appl. No. 11/439,593 dated Mar. 18, 2010, 14 pgs.
European Search Report and Written Opinion for Application No. EP 06771233 dated May 12, 2010 and completed May 5, 2010, 10 pgs.
Solid Base from Which to Launch New Digital Video Research Efforts, PR Newswire Association LLC, Mar. 19, 2003, 5 pgs.
International Search Report and Written Opinion for International Patent Application No. PCT/US2007/023185, dated May 14, 2008, 8 pgs.
International Preliminary Report on Patentability (Chapter I) for International Patent Application No. PCT/US2007/023185, dated May 5, 2009, 7 pgs.
International Search Report and Written Opinion for International Patent Application No. PCT/US2006/020343, dated Sep. 16, 2008, 8 pgs.
International Preliminary Report on Patentability (Chapter I) for International Patent Application No. PCT/US2006/020343, dated Oct. 14, 2008, 8 pgs.
Office Action for U.S. Appl. No. 11/439,600, dated Aug. 11, 2010, 6 pgs.
Office Action for U.S. Appl. No. 11/439,594, dated Aug. 12, 2010, 10 pgs.
Office Action for U.S. Appl. No. 11/439,594, dated Jan. 19, 2011, 10 pgs.
Office Action for U.S. Appl. No. 11/439,600, dated Jan. 26, 2011, 11 pgs.
Office Action for U.S. Appl. No. 11/713,116, dated Mar. 17, 2011, 16 pgs.
Office Action for U.S. Appl. No. 11/713,115, dated Mar. 23, 2011, 21 pgs.
Gowans, "Cookies Tutorial, Part 1—Introduction to Cookies", 2001, 3 pgs. at http://www.freewebmasterhelp.com/ tutorials/cookies.
Learn That, Apr. 2004, 2 pgs., WayBackMachine Internet Archive, at http://www.learnthat.com/courses/computer/attach/index.html.
Revision Control, Mar. 2005, 7 pgs., WayBackMachine Internet Archive, at Wikipedia, http://en.wikipedia.org/ wiki/Revision_control.
Carden, Making a Slideshow—Macromedia Flash Tutorial, 2001, 10 pgs. at http://www.designertoday.com/Tutorials/Flash/939/Making.a.slideshow.Macromedia.Flash.Tutorial.aspx, 2001.
"Control Remote Desktops through a Web Browser," Winbook Tech Article, Feb. 2004, 2 pgs., www.winbookcorp.com, at http://replay.waybackmachine.org/20040205135404/http://winbookcorp.com/_technote/WBTA20000870.htm.
European Search Report for European Patent Application No. 10195448.5, dated Mar. 9, 2011, 11 pgs.
European Search Report for European Patent Application No. 10195472.5, dated Mar. 9, 2011, 10 pgs.
Office Action for U.S. Appl. No. 11/713,115, dated Sep. 8, 2011, 23 pgs.
Flickr, "Tags," Dec. 30, 2004, 1 pg., WayBackMachine Internet Archive at http://www.flickr.com/photos/tags/.
Office Action for U.S. Appl. No. 11/713,115, dated Mar. 13, 2012, 18 pgs.
Examination Report for European Patent Application No. 10195472.5, dated Apr. 17, 2012, 6 pgs.
Examination Report for European Patent Application No. 06771233.1, dated Mar. 27, 2012, 5 pgs.
WebmasterWorld.com, "Ecommerce Forum: Using email address as a username," Oct. 2006, 3 pgs.
European Search Report for European Patent Application No. 10195448.5, dated Jul. 13, 2012, 5 pgs.
Final Office Action for U.S. Appl. No. 11/713,115, dated Nov. 14, 2012, 29 pgs.
Office Action for U.S. Appl. No. 13/011,002 dated Dec. 21, 2012, 19 pgs.
Office Action for U.S. Appl. No. 13/011,002, dated Apr. 22, 2013, 19 pgs.
Office Action for U.S. Appl. No. 11/439,600, dated May 30, 2013, 10 pgs.
Office Action for U.S. Appl. No. 11/439,594, dated Jun. 14, 2013, 11 pgs.
Office Action for U.S. Appl. No. 13/404,911, dated Aug. 8, 2013, 11 pgs.
Office Action for U.S. Appl. No. 13/408,843, dated Oct. 7, 2013, 15 pages.
Office Action for U.S. Appl. No. 13/408,843, dated May 7, 2014, 12 pgs.
Office Action for U.S. Appl. No. 13/011,002, dated Aug. 27, 2014, 22 pgs.
Office Action for U.S. Appl. No. 13/408,843, dated Aug. 28, 2014, 14 pgs.
Office Action for U.S. Appl. No. 14/229,601, dated Nov. 24, 2014, 8 pgs.
Office Action for U.S. Appl. No. 14/242,277, dated Nov. 25, 2014, 8 pgs.
Office Action for U.S. Appl. No. 11/713,115, dated Dec. 2, 2014, 27 pgs.
Duplicate file checking, I/O and Streams forum, CodeRanch, Nov. 2004, retrieved from <http://www.coderanch.com/t/277045/java-io/java/Duplicate-file-file-checking> and printed Oct. 21, 2014, 3 pgs.
Office Action for U.S. Appl. No. 13/408,843, dated Dec. 10, 2014, 16 pgs.
Summons to Attend Oral Proceedings pursuant to Rule 115(1) EPC for European Patent Application No. 10195448.5, dated Nov. 3, 2014, 4 pgs.
Summons to Attend Oral Proceedings pursuant to Rule 115(1) EPC for European Patent Application No. 10195472.5, dated Dec. 10, 2014, 5 pgs.
Office Action for U.S. Appl. No. 14/229,601, dated Mar. 16, 2015, 9 pgs.
Office Action for U.S. Appl. No. 14/242,277, dated Mar. 25, 2015, 10 pgs.
Office Action for U.S. Appl. No. 14/247,059, dated Jun. 3, 2015, 9 pgs.
Office Action for U.S. Appl. No. 14/229,601, dated Jun. 12, 2015, 12 pgs.
Office Action for U.S. Appl. No. 14/242,277, dated Jun. 24, 2015, 10 pgs.
Office Action for U.S. Appl. No. 13/408,843, dated Jul. 1, 2015, 16 pgs.
Office Action for U.S. Appl. No. 14/229,601, dated Oct. 5, 2015, 11 pgs.
Office Action for U.S. Appl. No. 14/242,277, dated Oct. 6, 2015, 11 pgs.
Office Action for U.S. Appl. No. 11/713,115, dated Oct. 5, 2015, 24 pgs.
Final Office Action issued for U.S. Appl. No. 13/011,002, dated Dec. 16, 2015, 22 pgs.
Final Office Action issued for U.S. Appl. No. 13/408,843, dated Jan. 13, 2016, 21 pgs.
Office Action for U.S. Appl. No. 14/885,632, dated Feb. 12, 2016, 23 pgs.
Office Action for U.S. Appl. No. 14/229,601, dated Mar. 18, 2016, 14 pgs.
Office Action for U.S. Appl. No. 14/242,277, dated May 5, 2016, 16 pgs.

(56) References Cited

OTHER PUBLICATIONS

Office Action for U.S. Appl. No. 14/968,425, dated Apr. 29, 2016, 8 pgs.
Office Action for U.S. Appl. No. 14/885,632, dated Jun. 3, 2016, 26 pgs.
Office Action for U.S. Appl. No. 13/408,843, dated Jun. 30, 2016, 24 pgs.
European Search Report for Application No. EP 15189067.0 dated Jun. 20, 2016, 10 pgs.
Office Action issued for U.S. Appl. No. 13/011,002, dated Sep. 8, 2016, 14 pages.
Office Action for U.S. Appl. No. 14/229,601, dated Oct. 24, 2016, 15 pgs.
Office Action for U.S. Appl. No. 14/242,277, dated Nov. 7, 2016, 15 pgs.
Office Action for U.S. Appl. No. 14/968,425, dated Nov. 21, 2016, 12 pgs.
Office Action for U.S. Appl. No. 13/011,002, dated Apr. 26, 2017, 15 pages.
Office Action issued for U.S. Appl. No. 15/450,836, dated Sep. 13, 2017, 23 pages.
Office Action issued for U.S. Appl. No. 13/011,002, dated Oct. 17, 2017, 16 pages.
Office Action issued for U.S. Appl. No. 15/489,191, dated Mar. 7, 2018, 24 pages.
Office Action issued for U.S. Appl. No. 15/450,836, dated Apr. 17, 2018, 34 pages.
Office Action issued for U.S. Appl. No. 15/450,836, dated Oct. 2, 2018, 28 pages.
Office Action issued for U.S. Appl. No. 15/891,885, dated Nov. 2, 2018, 13 pages.
Office Action issued for U.S. Appl. No. 15/918,804, dated Nov. 9, 2018, 11 pages.
Office Action issued for U.S. Appl. No. 15/365,308, dated Jan. 7, 2019, 11 pages.
Office Action issued for European Patent Application No. 15189067.0, dated Dec. 20, 2018, 4 pages.
Moritz et al., Understanding MPEG-4 Technology and Business Insights, Copyright 2005.
Office Action issued for U.S. Appl. No. 16/113,636, dated Apr. 2, 2019, 8 pages.
Kang et al., "Creating Walk-Through Images from a Video Sequence of a Dynamic Scene," Teleoperators and Virtual Environments, Dec. 2004, 1 page.
Office Action issued for U.S. Appl. No. 15/495,041, dated Jun. 24, 2019, 32 pages.
Summons to Attend Oral Proceedings issued for European Patent Application No. 15189067.0, mailed Jul. 23, 2019, 5 pages.
Office Action issued for U.S. Appl. No. 16/227,481, dated Sep. 30, 2019, 11 pages.
Office Action issued for U.S. Appl. No. 15/495,041, dated Nov. 18, 2019, 44 pages.
Office Action issued for U.S. Appl. No. 16/706,380, dated Jan. 22, 2020, 8 pages.
Office Action issued for U.S. Appl. No. 16/708,110, dated Jan. 22, 2020, 8 pages.
Office Action issued for U.S. Appl. No. 16/595,137, dated Feb. 7, 2020, 15 pages.
Office Action issued for U.S. Appl. No. 15/495,041, dated Jul. 23, 2020, 14 pages.
Office Action issued for U.S. Appl. No. 16/744,840, dated Jul. 22, 2020, 5 pages.
Notice of Allowance issued for U.S. Appl. No. 15/495,041, dated Nov. 16, 2020, 14 pages.
Notice of Allowance issued for U.S. Appl. No. 16/744,840, dated Nov. 17, 2020, 6 pages.
Office Action issued for U.S. Appl. No. 17/010,731 dated Apr. 1, 2022, 14 pages.
Office Action issued for U.S. Appl. No. 17/021,479 dated Mar. 28, 2022, 14 pages.
Office Action issued for U.S. Appl. No. 17/093,727 dated Mar. 31, 2022, 20 pages.
Notice of Allowance issued for U.S. Appl. No. 17/209,101 dated Mar. 18, 2022, 7 pages.
Office Action issued for U.S. Appl. No. 17/021,479 dated Jul. 22, 2022, 17 pages.
Office Action issued for U.S. Appl. No. 17/093,727 dated Sep. 1, 2022, 20 pages.
Office Action issued for U.S. Appl. No. 17/502,395 dated Sep. 14, 2022, 8 pages.
Office Action issued for U.S. Appl. No. 17/836,860 dated Oct. 13, 2022, 8 pages.
Office Action issued for U.S. Appl. No. 17/010,731 dated Oct. 27, 2022, 20 pages.
Notice of Allowance issued for U.S. Appl. No. 17/021,479 dated Nov. 17, 2022, 10 pages.
Office Action issued for U.S. Appl. No. 17/093,727 dated Dec. 23, 2022, 19 pages.
Notice of Allowance issued for U.S. Appl. No. 17/502,395 dated Dec. 15, 2022, 7 pages.
Notice of Allowance issued for U.S. Appl. No. 17/836,860 dated Jan. 27, 2023, 7 pages.
Final Office Action issued for U.S. Appl. No. 17/093,727 dated Mar. 31, 2023, 22 pages.
Final Office Action issued for U.S. Appl. No. 17/010,731, mailed May 16, 2023, 21 pages.
Notice of Allowance issued for U.S. Appl. No. 17/093,727, mailed Aug. 1, 2023, 9 pages.
Office Action issued for U.S. Appl. No. 18/170,764, mailed Jul. 7, 2023, 14 pages.
Office Action issued for U.S. Appl. No. 18/171,287, mailed Jul. 11, 2023, 10 pages.
Office Action issued for U.S. Appl. No. 17/010,731 mailed Sep. 8, 2023, 9 pages.
Notice of Allowance issued for U.S. Appl. No. 17/093,727, mailed Oct. 30, 2023, 9 pages.
Notice of Allowance issued for U.S. Appl. No. 18/171,287, mailed Oct. 30, 2023, 9 pages.
Notice of Allowance issued for U.S. Appl. No. 18/309,557, mailed Nov. 30, 2023, 9 pages.
Notice of Allowance issued for U.S. Appl. No. 17/010,731, mailed Dec. 29, 2023, 9 pages.
Office Action issued for U.S. Appl. No. 18/170,764, mailed Dec. 29, 2023, 12 pages.
Notice of Allowance issued for U.S. Appl. No. 17/093,727, mailed Mar. 20, 2024, 9 pages.

\* cited by examiner

DISTRIBUTED SCALABLE MEDIA ENVIRONMENT FOR ADVERTISING PLACEMENT IN MOVIES

CROSS-REFERENCE TO RELATED APPLICATIONS

This is a continuation of, and claims a benefit of priority from, U.S. patent application Ser. No. 15/495,041, filed Apr. 24, 2017, issued as U.S. Pat. No. 10,950,273, entitled "DISTRIBUTED SCALABLE MEDIA ENVIRONMENT FOR ADVERTISING PLACEMENT IN MOVIES," which is a continuation of, and claims a benefit of priority from, U.S. patent application Ser. No. 13/011,002, filed Jan. 21, 2011, issued as U.S. Pat. No. 9,934,819, entitled "DISTRIBUTED SCALABLE MEDIA ENVIRONMENT FOR ADVERTISING PLACEMENT IN MOVIES," which is a continuation of, and claims a benefit of priority from, U.S. patent application Ser. No. 11/439,593, filed May 23, 2006, issued as U.S. Pat. No. 7,877,689, entitled "DISTRIBUTED SCALABLE MEDIA ENVIRONMENT FOR MOVIE ADVERTISING PLACEMENT IN MOVIES," which claims a benefit of priority from U.S. Provisional Application No. 60/683,662, filed May 23, 2005, entitled "DISTRIBUTED SCALABLE MEDIA ENVIRONMENT." All applications listed in this paragraph are fully incorporated by reference herein for all purposes.

BACKGROUND OF THE INVENTION

The invention relates to distributed network systems, mass data storage and retrieval, non-linear editing systems and, more particularly, to a distributed network media system for the capture, archive, editing, analytical content retrieval of audio/visual information for web based media download or streaming distribution as well as authoring various files for network-accessible and end-user standalone devices including mobile phones, and audiovisual playback devices.

Linear media editing systems used for analog audio, video tape and photographic film are manual, time consuming and cumbersome to reduce content into a final form and distribute. In more recent times computer systems allow for time efficient non-linear video editing systems. Current non-linear editing on computer oriented systems involves capturing media content permitting rapid access to the media content at any point in the linear sequence for moving portions into any order and storing the media content on a storage device, such as a magnetic disk drive or digital versatile disk (DVD).

The average person currently has small set of alternatives for editing content from media capture devices such as camcorders, camera phones, audio recorders, and other media capture devices without having to incur the costs of a computer system and software for editing. In addition, non-linear editing systems are complex and very difficult to use.

People capture various random and personally interesting events, such as work, travel and entertainment event using their camcorders or camera phones. To edit this content, people require easy to use non-linear editing systems that facilitate editing without a high degree of computer or editing skill.

Media content storage technologies provide for storing great amounts of interactive multimedia, for example, the DVD format. Unfortunately, the DVD Specification for authoring is very complex, as are the computer systems that attempt to embody it. A further disadvantage of conventional DVD authoring systems is that they provide a DVD author with only minimal control and flexibility.

The process of authoring a DVD includes a number of complex steps and equipment. Accordingly, there is a need for authoring systems and methods that reduces the time, cost and complexity of the authoring and distributing DVD.

Separate and distinct systems for computer based non-linear editing, DVD authoring, and distributions are known. However, no system exists that accomplishes all in an environment that can be distributed and accessed by computer networks, such as the Internet, wide area networks (WAN), local area networks (LAN).

SUMMARY OF THE INVENTION

In accordance with an aspect of this invention, there is provided a system for and a method of placing an ad in a movie, comprising selecting the ad from a set of ads, selecting the location in a frame where the ad is to be placed, selecting the frames of the movie where the ad is to be placed, and placing the selected ad in the selected frames at the selected location.

In some cases, a graphical user interface enables at least one of selecting the ad by manipulating a graphical image representing the ad, selecting the location in a frame by manipulating a graphical image representing the frame location, and selecting the frames by manipulating a graphical image representing the frames of the movie.

In some cases, a computer selects the ad, the location in the frame, and the frames of the movie. The computer selects the frames in accordance with a popularity measurement of the frames of the movie, based on the placement of deep tags in the movie by a plurality of users.

It is not intended that the invention be summarized here in its entirety. Rather, further features, aspects and advantages of the invention are set forth in or are apparent from the following description and drawings.

DETAILED DESCRIPTION

As used herein and in the claims, the term "movie" refers to video and/or audio data intended for display to a human. In some cases, the video and audio data are separate but associated data, while in other cases, the video and audio are combined. In still other cases, video exists without audio, and vice-versa. Video encompasses still image data and moving image data.

The disclosures of the following patents are hereby incorporated by reference in their entirety:

| U.S. Patent No. | Issue Date | Title |
| --- | --- | --- |
| 5,880,722 | Mar. 9, 1999 | Video cursor with zoom in the user interface of a video editor |
| 5,886,692 | Mar. 23, 1999 | Attracting/repelling edit blocks in a user interface of a video editor |
| 6,027,257 | Feb. 22, 2000 | Pan and tilt unit |
| 6,157,771 | Dec. 5, 2000 | Method and apparatus for seeking within audiovisual files |
| 6,181,883 | Jan. 30, 2001 | Dual purpose camera for VSC with conventional film and digital image capture modules |
| 6,201,925 | Mar. 13, 2001 | Method and apparatus for editing video files |
| 6,262,777 | Jul. 17, 2001 | Method and apparatus for synchronizing edited audiovisual files |
| 6,285,361 | Sep. 4, 2001 | Method and apparatus for clipping video segments from an audiovisual file |
| 6,400,886 | Jun. 4, 2002 | Method and apparatus for stitching edited video segments |
| 6,661,430 | Dec. 9, 2003 | Method and copying an apparatus for audiovisual segment |

Figure 1:
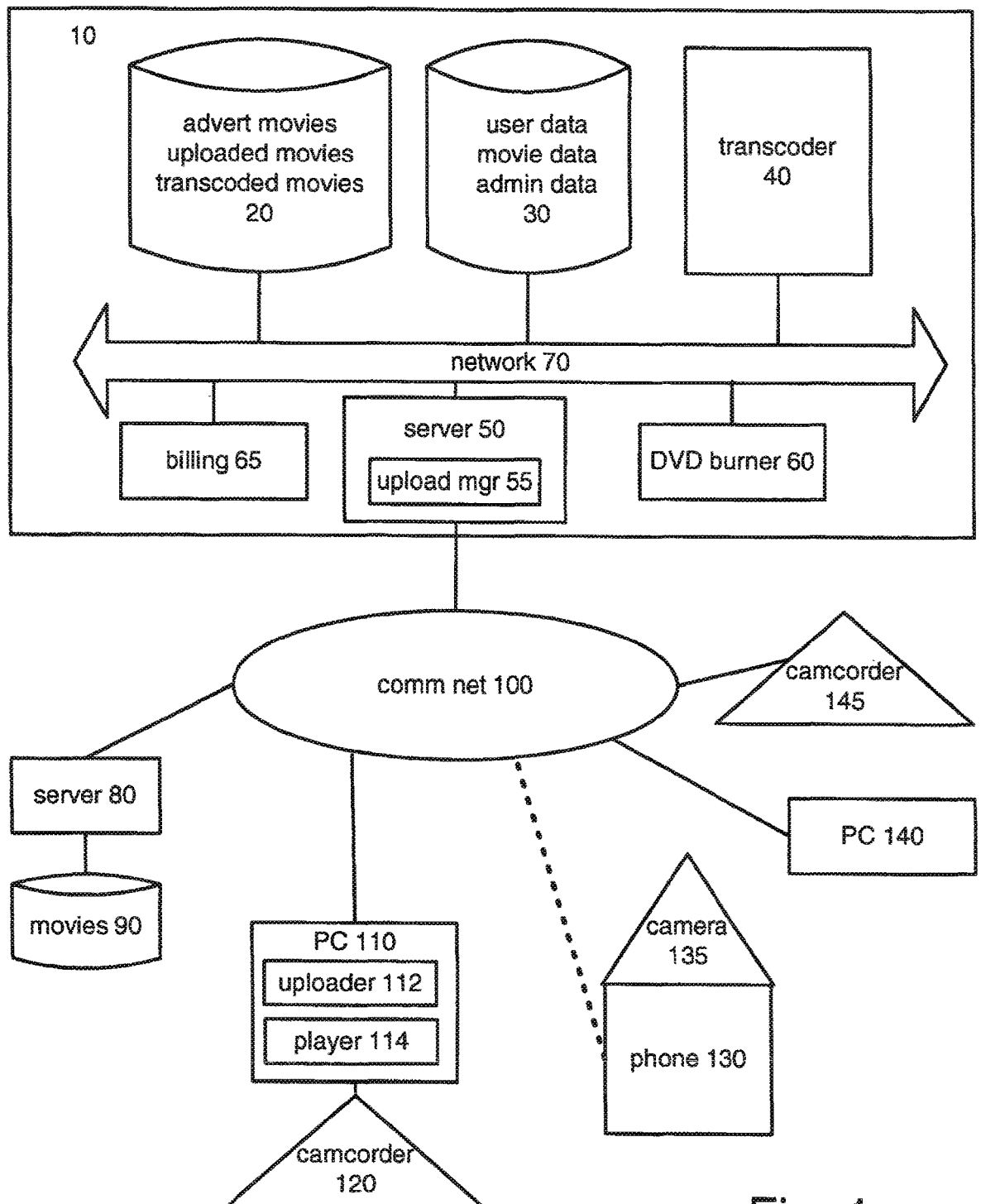
FIG. 1 is a configuration diagram for one embodiment of the present invention wherein the transcoder is used via a public communication network.

There are several environments in which a user might want to use a movie. Turning to FIG. 1, an environment including public communication network 100 is shown. Network 100 may be the Internet. Coupled to network 100 are movie system 10, server 80, PC 110, phone 130, PC 140 and camcorder 145. Coupling occurs via wireline and/or wireless communication lines, possibly with intermediate computers such as an Internet service provider (not shown).

Movie system 10 includes videobase 20, database 30, transcoder 40, server 50, DVD burner 60 and internal network 70. In some embodiments, videobase 20 and database 30 are combined. Elements 20, 30, 40, 50 are general purpose computers programmed according to the present invention, and include suitable processors, memory, storage and communication interfaces; and each element may be embodied in one or many physical units depending on factors such as expected processing volume, redundant hardware design and so on.

Videobase 20 serves to store movies uploaded by users, in their uploaded format, and to store transcoded versions of these movies. Videobase 20 also stores advertisement movies, referred to herein as "ads," intended for inclusion in the transcoded movies.

Database 30 serves to store data for movie system 10, including data relating to users of movie system 10, movies processed by movie system 10, and suitable administrative data such as usage, throughput and audit trail information. In some embodiments, users use movie system 10 for free and the suppliers of ads pay upon ad viewing. In other embodiments, users pay based on usage or a flat rate.

Transcoder 40 serves to receive uploaded movies and process them to generate transcoded movies, as described in detail below with regard to FIG. 7.

Server 50 receives requests from users via network 100 and responds thereto. In cases where responding to a request requires the services of transcoder 40, server 50 passes appropriate messages between transcoder 40 and network 100. Server 50 also functions as a firewall to protect network 70 from improper usage.

Server 50 executes upload manager 55, a software program that works with uploader 112, described below, to upload a movie to server 50.

DVD burner 60 is responsive to commands from transcoder 40 to create a digital video disk, which is then shipped via conventional physical shipping services.

Billing program 65 examines usage data created by transcoder 40 and server 50. The usage data is part of the administrative data in database 30. Billing program 65 then generates invoices and applies authorized payments. For example, some users may have preauthorized charges to their credit cards, telephone bills or bank accounts for their usage of movie system 10. As another example, transcoded movies created by users may include advertising, for which the advertisers agree to pay based on number of views, and if so, billing system 65 arranges payments to users based on usage of the transcoded movies with advertising.

There is a cost to store and distribute movies. To offset this cost, and to reward users, movie system 10 enables movie creators to include ads, either manually or automatically, in their movies. Movie system 10 enables flexible ad placement, including at the start or end of a movie, within selected frames of a movie, and at a selected location and size within the selected frames. Advertisers generally pay for placement of their ads based on number of times their ad is viewed, and possibly in accordance with the popularity of the place in the movie where the ad is inserted, how much time the ad is inserted for, and the size of the ad relative to a movie frame.

Internal network 70 serves to carry communication traffic between the elements of movie system 10. Internal network 70 may be a local area network at a single premises, or may span multiple premises.

Server 80 is a general purpose computer coupled to storage 90. Server 80 responds to requests from communication network 100 by providing movies stored in storage 90. By providing the address of server 80 to movie system 10, one of the movies stored in storage 90 can be used as an input for transcoder 40.

PC 110 is a general purpose personal computer coupled to camcorder 120. Camcorder 120 enables a user to record a movie and transfer the movie to PC 110.

PC 110 executes uploader 112 and player 114. Uploader 112 is a software program that enables a movie to be uploaded from PC 110 to server 50. Player 114 is a software program that enables PC 110 to view and edit movies, in conjunction with transcoder 40. When PC 110 registers with server 50, server 50 downloads uploader 112 and player 114 to PC 110.

Uploader 112 functions to locate movie files stored in PC 110, and to manage transmission of the movie files to upload manager 55 of server 50 using a suitable protocol such as the secure file transfer protocol (sftp). In embodiments having a peer-to-peer network for downloading, such as networks using the bittorrent protocol, the peer-to-peer network is also used for uploading. Since movie files are large, the file uploading may be interrupted; uploader 112 enables the uploading to resume at its interruption point. In some embodiments, uploader 112 converts a very large file, such as a 36 Mb file in DV format, to a smaller file of comparable visual quality, such as a 3 Mb files in MPEG format. Uploader 112 enables the user of PC 110 to select a file for uploading; to monitor the status of the upload, such as percent completed and speed of uploading; to pause and resume the uploading; and to cancel the uploading.

Player 114 is a client application for a PC browser. In some embodiments, player 114 resides on a portable device such as a mobile phone or network-attached digital video camera without a browser, and in these embodiments, player 114 is a network enabled client application.

Player 114 enables a user to view a movie, including forward seek and rewind functions; to seek the compressed video on a remote server using random seek points; to request a movie download from the random seek point, for example, in accordance with U.S. Pat. No. 6,157,771, the disclosure of which is hereby incorporated by reference in its entirety; and to use the functions described below with regard to FIG. 7 on the movie, including creating and editing deep tags, creating and editing mash-ups, adding special effects, providing sharing permission to other users, creating virtual and/or physical DVDs, inserting ads, and creating and editing watermarks. FIG. 8, discussed below, shows a graphical user interface for player 114.

Phone 130 is a wireless communication device executing versions of uploader 112 and player 114 adapted for the device capabilities of phone 130. Phone 130 is a coupled to camera 135, which serves to capture images and provide the captured images to phone 130 as a movie signal. In some embodiments, phone 130 uses the multimedia messaging service (MMS) protocol to transmit and/or receive movies. In other embodiments (not shown), phone 130 communicates with a local network using a protocol such as WiFi, and the WiFi network in turn communicates with communication network 100.

PC 140 is a general purpose personal computer that is able to view transcoded movies by obtaining an address for the movie, or a segment thereof, and providing the address to server 50. As an example, a user of PC 110 or a user of phone 130 may upload a movie to movie system 10, edit the uploaded movie, and provide to the user of PC 140, via email, an address of an edited segment that the user of PC 140 is permitted to view.

Camcorder 145 is a network enabled movie capture device configured to upload its recordings to movie system 10. In some embodiments, there is at least one predefined user group able to immediately edit information uploaded from camcorder 145. This configuration is useful in a security application, for example.

The user of PC 110 or phone 130 serves as an editor. PC 110, phone 130, PC 140 and camcorder 145 are each at respective locations that are remote from the location of movie system 10.

Figure 2:
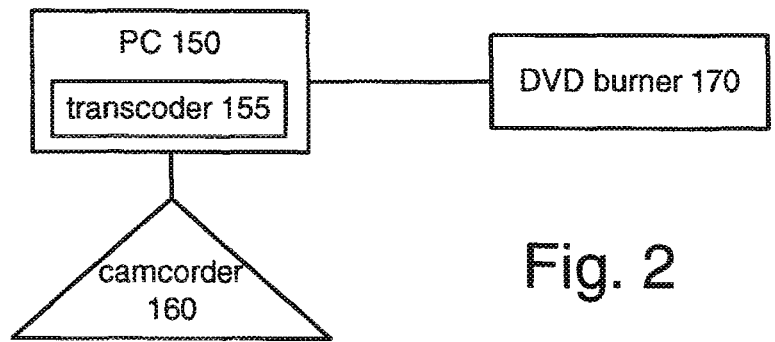
FIGS. 2-4 are configuration diagrams for other embodiments of the present invention wherein the transcoder resides locally.
Figure 3:
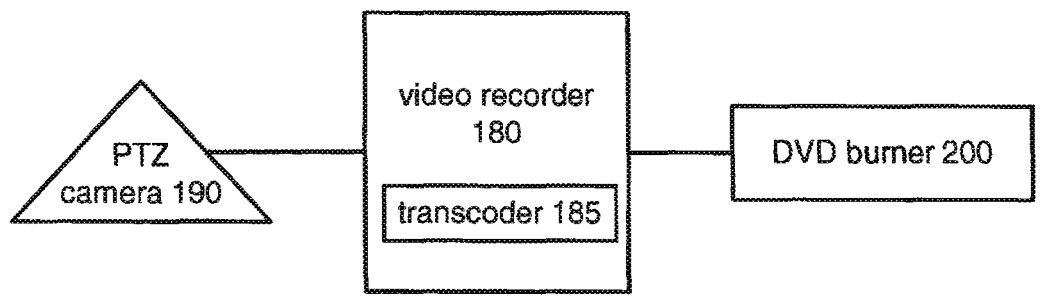
Figure 4:
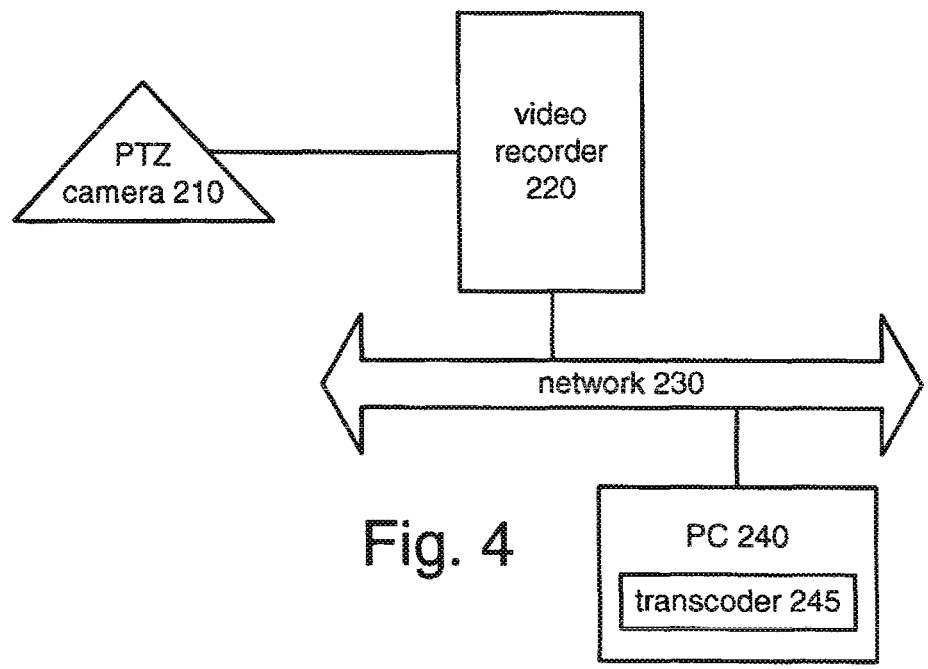

FIGS. 2-4 illustrate other embodiments of the present invention wherein the transcoder is local to the movie file, that is, the movie file is not uploaded via a public communication network. This is sometimes referred to as a transcoder appliance model.

FIG. 2 shows PC 150, camcorder 160 and DVD burner 170. Camcorder 160 is for recording a movie and providing the recorded movie to PC 150. PC 150 is a general purpose personal computer operative to receive and store a recorded movie; to enable a user to edit the stored movie using transcoder 155, which is a software program operative in a similar manner as transcoder 40; and to provide a transcoded movie to DVD burner 170 for recording thereon, in similar manner as DVD burner 60.

FIG. 3 shows video recorder 180, robotic camera with pan-tilt-zoom (PTZ) control 190, and DVD burner 200. Robotic camera 190 is operative to provide a video signal to video recorder 180. Video recorder 180 is a general purpose computer operative to receive and store the video signal from robotic camera 190, to enable a user to edit the stored video using transcoder 185, which is a software program operative in a similar manner as transcoder 40; and to provide a transcoded movie to DVD burner 200 for recording thereon, in similar manner as DVD burner 60.

FIG. 4 shows robotic camera 210, video recorder 220, private network 230 and PC 240. PTZ camera 210 is operative to provide a video signal to video recorder 220. Video recorder 220 is operative to receive and store the video signal from robotic camera 210, and to provide the stored video to PC 240 via private network 230. Private network 230 is a local area network, virtual private network, or the like, which serves to couple video recorder 220 and PC 240. PC 240 is a general-purpose personal computer operative to receive video from video recorder 220, sometimes in response to a command from PC 240 and sometimes on a periodic or as-available basis from video recorder 220; to store the received video; and to execute transcoder 245 to edit the stored video to produce transcoded video. Transcoder 245 is a software program operative in a similar manner as transcoder 40.

Figures 5, 6:
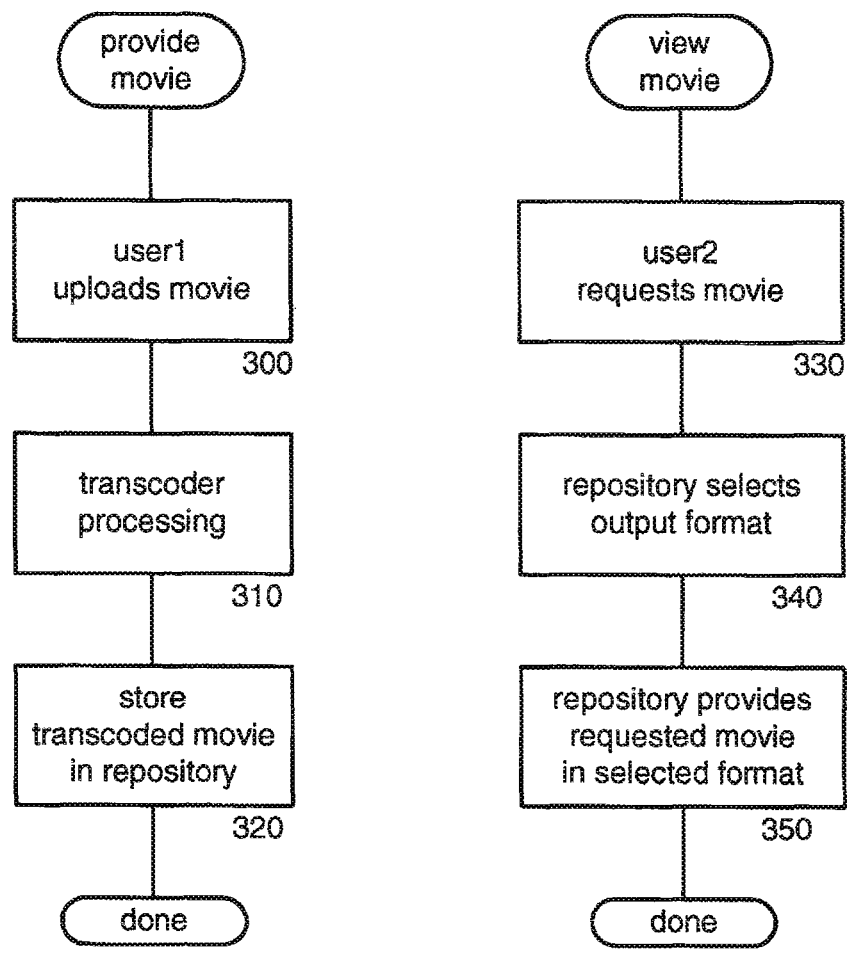
FIGS. 5-6 are flowcharts depicting high-level operation of movie uploading and downloading, respectively.

FIGS. 5-6 are flowcharts depicting high-level operation of movie uploading and downloading, respectively.

Turning to FIG. 5, at step 300, user1 (not shown) at PC 110 uploads a movie to server 50, such as a movie recorded by camcorder 120. The uploaded movie is in an original format, also referred to as a first format or an uploaded format. In some cases, user1 provides an address of server 80, and instructs server 50 to retrieve the movie from server 80. Server 50 stores the uploaded movie in videobase 20. At step 310, transcoder 40 processes the uploaded movie, enabling the user to edit the uploaded movie as described in detail below, to produce a transcoded movie. The transcoded movie is in a proxy format, also referred to as a second format or an intermediate format.

At step 320, transcoder 40 stores the transcoded movie in videobase 20. As described below, user1 can grant permission to other users to view the whole of the transcoded movie, or to view segments of the transcoded movie, by providing suitable addresses to the authorized users.

Turning to FIG. 6, at step 330, user2 (not shown), who has received permission to view the transcoded movie, sends a request for the movie to server 50. The request includes information about the display capability of the device used by user2, such as phone 130 or PC 140.

At step 340, server 50 requests the selected movie from videobase 20, indicating the format for the movie.

At step 350, if the requested format happens to match the stored format, then the movie is provided directly to server 50. Otherwise, videobase 20 is operative to convert the format from the stored format to the requested format. The movie is provided in the requested format, also referred to as a third format, a downloaded format, or an output format. Server 50 then sends the provided movie to user2 via suitable distribution method such as streamed video or podcast, or presentation on a web page, blog, wiki, really simple syndication (RSS) or other technique. In some embodiments, videobase 20 sends the stored movie to transcoder 40, for conversion to the requested format, and then transcoder 40 provides the movie in the requested format to server 50.

Figure 7A:
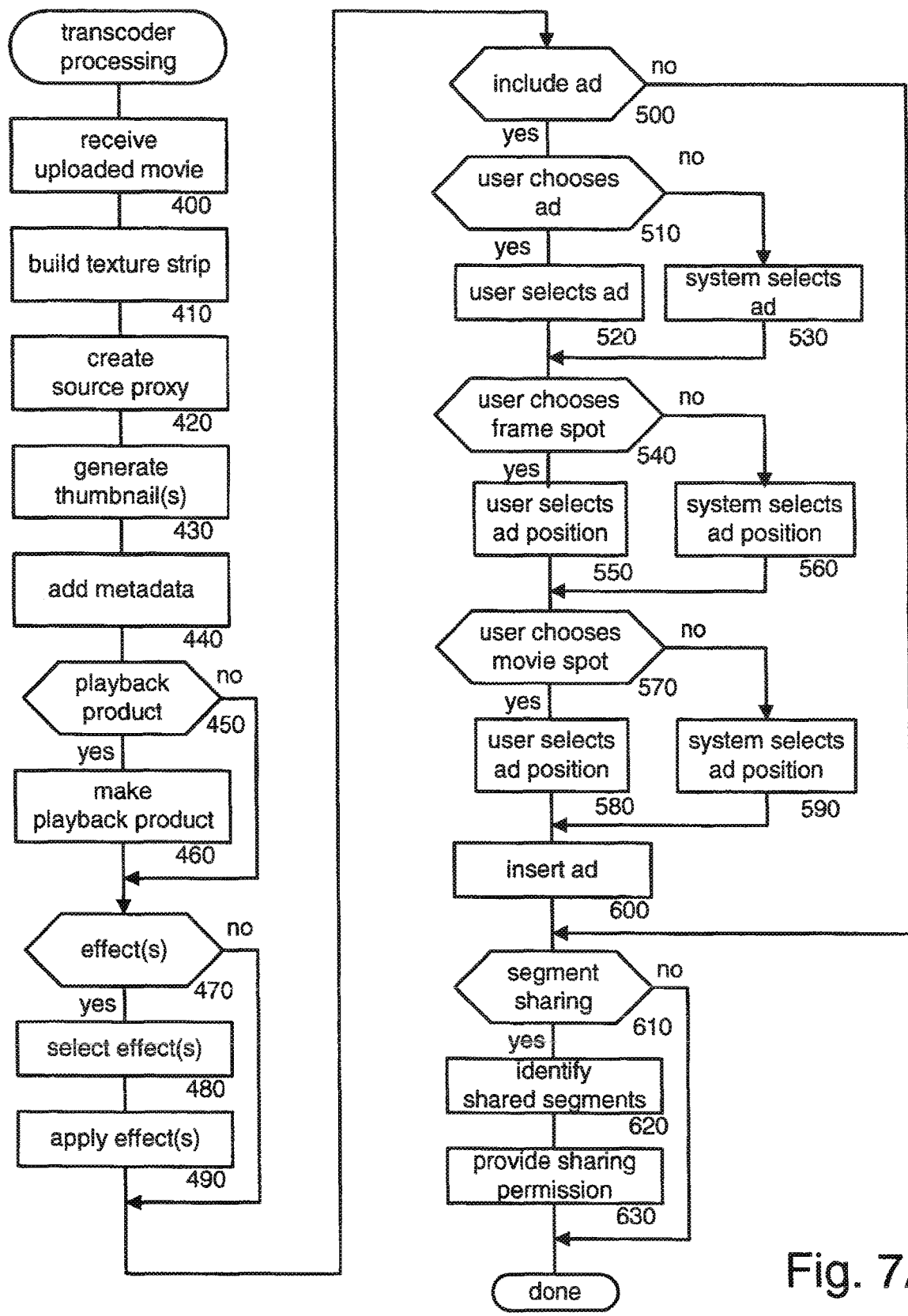
FIGS. 7A and 7B are a flowchart depicting transcoder operation.
Figure 7B:
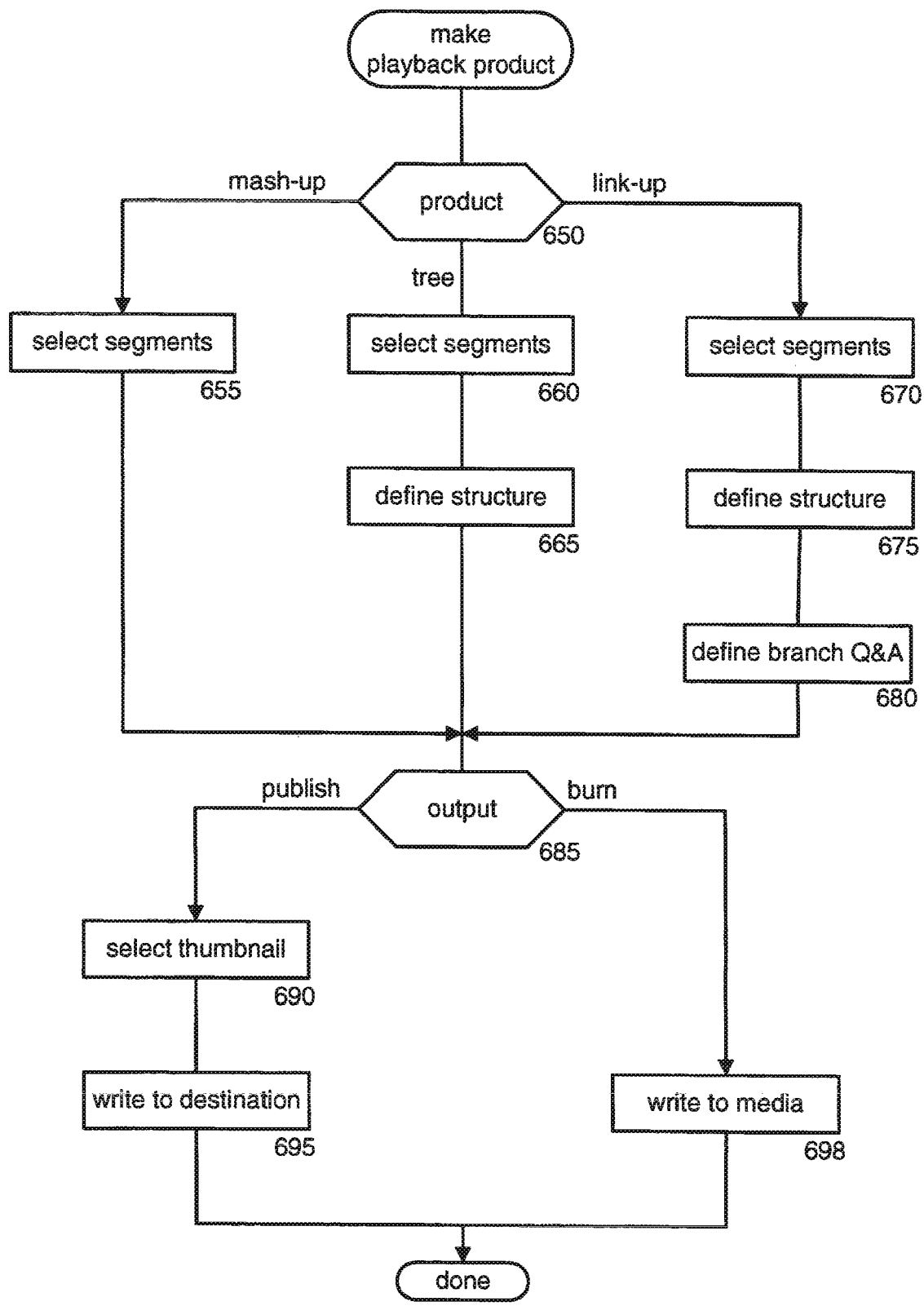
Figure 8:
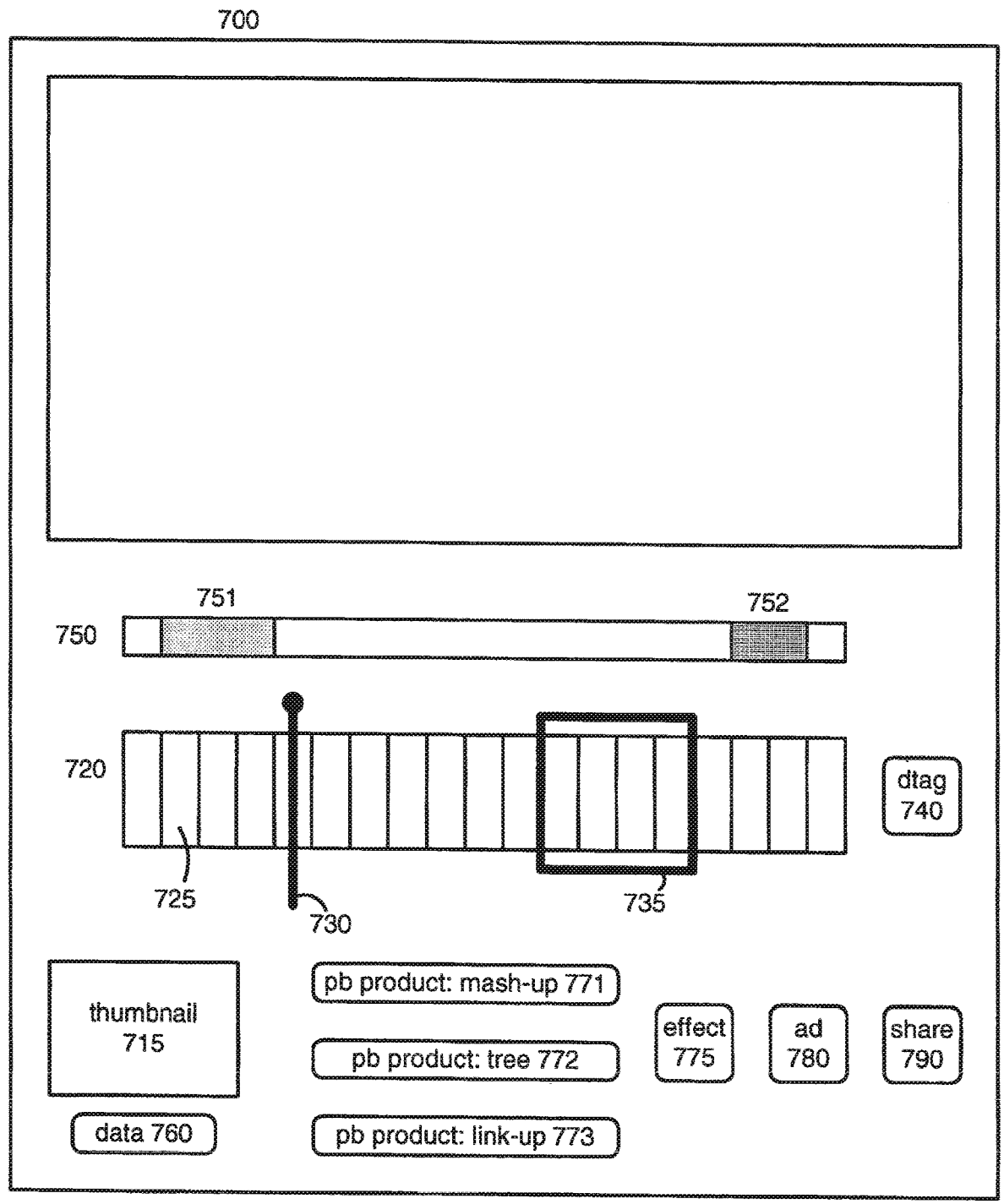
FIG. 8 is a diagram of a user interface including a texture strip and deep tag marker.

FIGS. 7A and 7B, collectively referred to as FIG. 7, are a flowchart depicting transcoder 40 operation.

As an overview, transcoder 40 receives an uploaded movie, creates a representation for easy editing, and adds user-supplied editing data (steps 400-440) to create a transcoded movie. Then, at the user's option, some, all or none of the following functions can be performed, in any desired sequence, and in as many editing sessions as desired:

creating a playback product using the transcoded movie, the playback product being one of a mash-up, a tree or a link-up (steps 450-460);
adding special effects (steps 470-490),
including advertising movies in the transcoded movie (steps 500-600), and
providing permission for other users to view all of the transcoded movie, or segments of the transcoded movie (steps 610-630).

Including an advertising movie in a transcoded movie ensures that even if the viewer of the transcoded movie has a filter for blocking advertising pop-ups and the like, the included advertising movie is viewed, since the filter considers the advertising movie to be part of requested content.

At step 400 of FIG. 7, transcoder 40 receives the uploaded video, either from the user or from another web site. The video may be in one of several formats, some of which involve compression using a scheme wherein a compressed frame refers to an earlier and/or later frame, and then provides change information relative to the earlier and/or later frames. Transcoder 40 converts the uploaded movie to a series of self-referential (uncompressed) frames. Generally, a frame is a collection of picture elements (pixels) corresponding to an image presented to a human viewer.

At step 410, transcoder 40 builds a texture strip representing the movie. Specifically, transcoder 40 applies a function to each frame to generate texture data, and saves the texture data as a video image. For example, the function might be to extract the center 8×8 pixels of each frame and realign into a 64 pixel height column and the texture strip is the sequence of 64 pixel columns. The texture strip may be saved as a .jpg file. The texture strip serves to represent the entire movie in a convenient information bar, and is sometimes referred to as a navigation bar. The texture strip is an intuitive way of determining the temporal position of a frame relative to the entirety of a movie. The texture strip often is useful in detecting scene changes, which is important when deciding which frames to group together as a segment.

At step 420, transcoder 40 creates a source proxy for the uploaded movie. Generally, a source proxy is a representation of the frames of the movie in a particular format that is easy to convert to other formats and to distribute via public communication network 100. For example, the Flash video format, according to the H.263 standard, can be used for the source proxy.

Using a source proxy reduces the format conversion issue. Specifically, if there are n movie formats, a general transcoder should be able to convert from any input to any output format, which, by brute force, would require n2 different format converters. However, using a source proxy means that only 2n format converters are needed (n converters to the source proxy format, and another n converters from the source proxy format to the output format). Additionally, as new movie formats become available, supporting them requires creating only 2 converters per format (one to the source proxy format, and one from the source proxy format), rather than 2n with the brute force approach. It is recognized that, sometimes, the source proxy format may be the desired output format.

Editing of the proxy format, also referred to as proxy editing, may occur in several ways.

In one embodiment of proxy editing, the edits are applied directly to the proxy frames.

In another embodiment of proxy editing, the proxy frames are maintained as generated, and an edit list is created, comprising edits to be sequentially applied to the proxy frames. Each time the edited movie is provided, the edits are applied anew to the proxy frames. This embodiment is particularly useful when edits need to be undone, or when many users are editing one movie to create separate edited movies.

In a further embodiment of proxy editing, a hybrid approach is used, wherein during an edit session, an edit list is created, and only at the termination of the edit session are the edits applied directly to the proxy frames.

At step 430, transcoder 40 generates a thumbnail as a visual representation of the entire movie. Typically, the user selects a frame, and transcoder 40 reduces it to a thumbnail size, such as 177×144 pixels. A user having many stored movies can conveniently view their thumbnails, rather than or in addition to text descriptions and/or filename descriptions.

At step 440, transcoder 40 accepts metadata from the user. Movie metadata may include a filename for the transcoded movie, subject matter keywords associated with the movie, a short text description to be associated with the thumbnail, any deep tags the user cares to define, address information such as a hyperlink of information to be associated with the transcoded movie, and an associated movie such as an audio file describing the contents of the movie.

A deep tag is a video bookmark, indicating a sequential group of frames that are to be treated as a separately addressable segment; the deep tag metadata includes the movie filename, the user filename, date of creation of the deep tag, date of most recent modification of the deep tag, a deep tag filename, the start frame, the end frame, the duration of the segment, and a short text description of the segment. A deep tag is understood to be a convenient way of identifying a segment.

FIG. 8 shows screen display 700 of player 114, provided, for example, at PC 110, and including video display 710, thumbnail 715, texture strip 720, positioner 730, deep tag marker 735, deep tag button 740, deep tag bar 750, and function buttons 760, 771, 772, 773, 775, 780 and 790.

Video display 710 shows the current frame of video. When the editor's device, such as PC 110 or phone 130 permits, the video frame is displayed in its proxy format. However, if the editor's device cannot support the proxy format, the transcoder 40 converts edited frames to an output format suitable for the editor's device prior to sending the edited frames to the editor for display.

Thumbnail 715 is a small image representing the entire movie.

Texture strip 720 comprises sequential frame representations 725 and subsequent information; each frame representation 725 is the result of the function used to create the texture strip, such as a vertical column of 64 pixels, and represents a single frame. Subsequent information indicates special effects applied to the frames and any advertising inserted in the frames.

Positioner 730 indicates where the frame display in video display 710 is located relative to the entirety of the movie. Positioner 730 enables the editor to use texture strip 720 to seek frames in the movie in a random access manner.

Deep tag marker 735 has a left edge that can be adjusted by a user, and also has a right edge that can be adjusted by the user; after the user has adjusted the left and right edges of deep tag marker 735, the user indicates that these settings should be saved as a deep tag, such as by clicking deep tag button 740, and providing a text description corresponding to the movie segment indicated by the deep tag. Deep tag marker 735 enables the editor to use texture strip 720 to select a segment of the movie.

Deep tag bar 750 is a visual representation of deep tags that have already been created for the movie. In the example of FIG. 8, deep tags 751 and 752 have previously been created for the movie, and are located near the start and end, respectively, of the movie being edited.

Function buttons 760, 771, 772, 773, 775, 780 and 790 enable the user to edit the movie. Data button 760 enables the user to view and edit metadata associated with the movie. Playback product buttons 771, 772 and 773 take the user to specialized editing interfaces, discussed below. Effects button 775 enables the user to add and edit special effects. Ad button 780 enables the user to include advertising in the movie. Sharing button 790 enables the user to grant permission to other users or user groups to view selected segments of the movie.

At step 450 of FIG. 7, transcoder 40 determines whether the user wishes to create a playback product. If so, at step 460 of FIG. 7A, the steps of FIG. 7B are executed by transcoder 40.

Turning to FIG. 7B, at step 650, transcoder 40 receives the user's selection of which playback product is to be created. For instance, using the editing interface of FIG. 8, the user indicates which playback product by selecting one of buttons 771, 772, 773. In this embodiment, three products are defined. In other embodiments, other products are available. The playback products are a mash-up, a tree, and a link-up.

A mash-up is a sequential display of selected segments. A viewer of a mash-up playback product can only navigate forward or backward in the product.

A tree is a set of segments and a hierarchical, linear control structure for displaying the segments. Generally, a viewer of a tree playback product clicks on selections to navigate the product, in addition to forward and backward.

A link-up is a set of segments and a non-linear control structure for displaying the segments. Generally, a viewer of a link-up playback product navigates via one or more of: forward and back movement, clicking on selections, and/or providing alphanumeric input. A tree and a mash-up are constrained forms of a link-up.

If a mash-up is selected, at step 655, the user selects the sequence of segments to be included via a mash-up editor. Then, at step 685, the user selects whether the mash-up is to be published or burned.

Publishing means transferring the mash-up to videobase 20 or to user PC 110. If publishing is selected, at step 690, the user selects a thumbnail to represent the mash-up, and provides metadata if desired such as a mash-up filename. At step 695, the user indicates a destination for the mash-up file, such as videobase 20, or PC 110. Transcoder 40 responds by transferring the mash-up in accordance with the user's selections.

Burning means writing the mash-up to a removable storage medium, such as a DVD or memory chip, and sending the removable storage medium to the user. If burning is selected, at step 698, transcoder 40 transfers the mash-up file to the removable storage medium type designated by the user. In the case of a DVD, transcoder 40 sends the mash-up file to DVD burner 60, which creates a DVD having the mash-up.

Figure 9A:
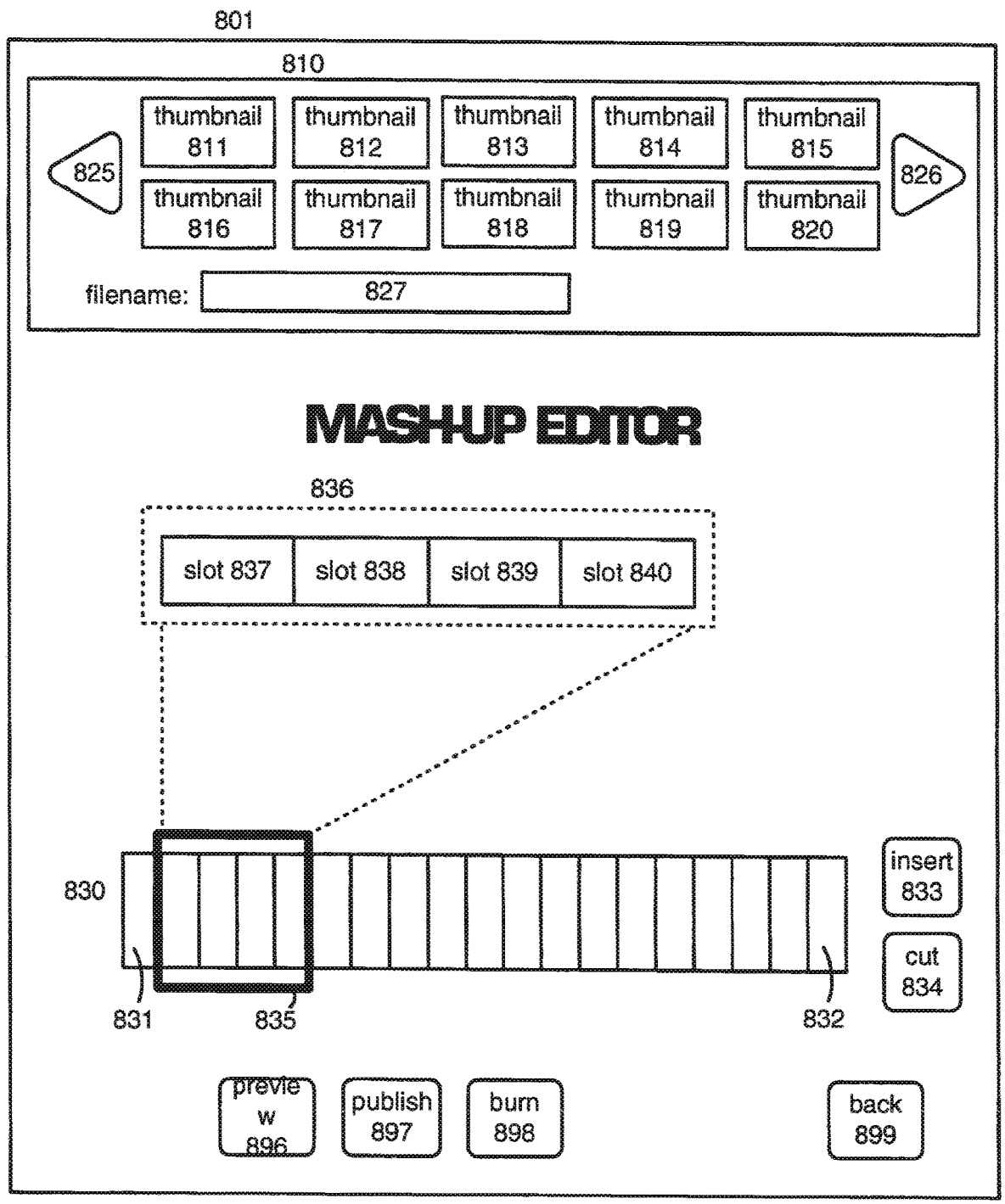
FIGS. 9A-9H are diagrams used in explaining specialized editing capabilities.

FIG. 9A shows mash-up editor interface 801. Thumbnail area 810 includes navigation buttons 825, 826 for altering which thumbnails of the user's stored thumbnails are displayed in area 810. In general, a user acquires stored files, represented by thumbnails, by uploading a movie, image, graphic or audio file; selecting frames of an existing movie; or creating a playback product as described herein. After storing a file, the user can edit the file by selecting the file's thumbnail in one of the specialized editors discussed herein. Thumbnail area 810 shows ten thumbnail windows 811-820, but a user may have hundreds of stored files, each with a corresponding thumbnail. Filename entry window 827 enables a user to type in the name of a file, or select a filename from a directory, which puts the file's thumbnail in thumbnail window 811.

Slots area 836 comprises placeholders into which the editor, also referred to as the user, drags and drops thumbnails to indicate that the thumbnails are part of the mash-up being created. Slots area 836 includes slots 837, 838, 839, 840.

Texture strip 830 represents the mash-up being created. Phantom start and end frames 831, 832 enable the user to add thumbnails before or after the selected thumbnails. Frame selector 835 has start and end portions that can be adjusted by the user. After the user is satisfied with the thumbnails dragged into slots 837-840, the user clicks insert button 833 to insert these thumbnails into the mash-up. In response, transcoder 40 creates a frame representation of each thumbnail, puts the thumbnail frame representation in the appropriate frame of texture strip 830, and clears slots 837-840. To insert subsequent files into the mash-up, the user moves frame selector 835 to a position after the inserted thumbnails. To insert preceding files into the mash-up, the user moves frame selector 835 to include phantom frame 831. To delete files from the mash-up, the user positions frame selector 835 on the frame representations of the thumbnails of the files to be deleted, and clicks cut button 834.

At any time, the user can click preview button 896 to see what the mash-up will look like. In response to preview button 896, transcoder 40 creates preview window 802 having viewing area 803, and navigation button 804-807, and begins playing the mash-up in preview window 803. The user clicks back button 804 to "rewind" the playback, forward button 805 to "advance" the playback, pause button 806 to pause the playback, and stop button 807 to terminate the playback and close preview window 802.

Publish button 897 enables the user to indicate to transcoder 40 that publication of the mash-up is desired. Clicking publish button 897 causes transcoder 40 to pop-up a window (not shown) that enables the user to select a thumbnail and destination.

Burn button 898 enables the user to indicate to transcoder 40 that burning of the mash-up is desired. Clicking burn button 898 causes transcoder 40 to pop-up a window (not shown) that enables the user to select a media for burning and provide delivery directions for the burned media.

Back button 899 enables the user to return to edit window 700 in FIG. 8. If a tree playback product is selected, at step 660, the user selects the sequence of segments to be included via a tree editor, and at step 665, defines the tree structure. Then, at step 685, the user selects whether the tree playback product is to be published or burned.

Figure 9B:
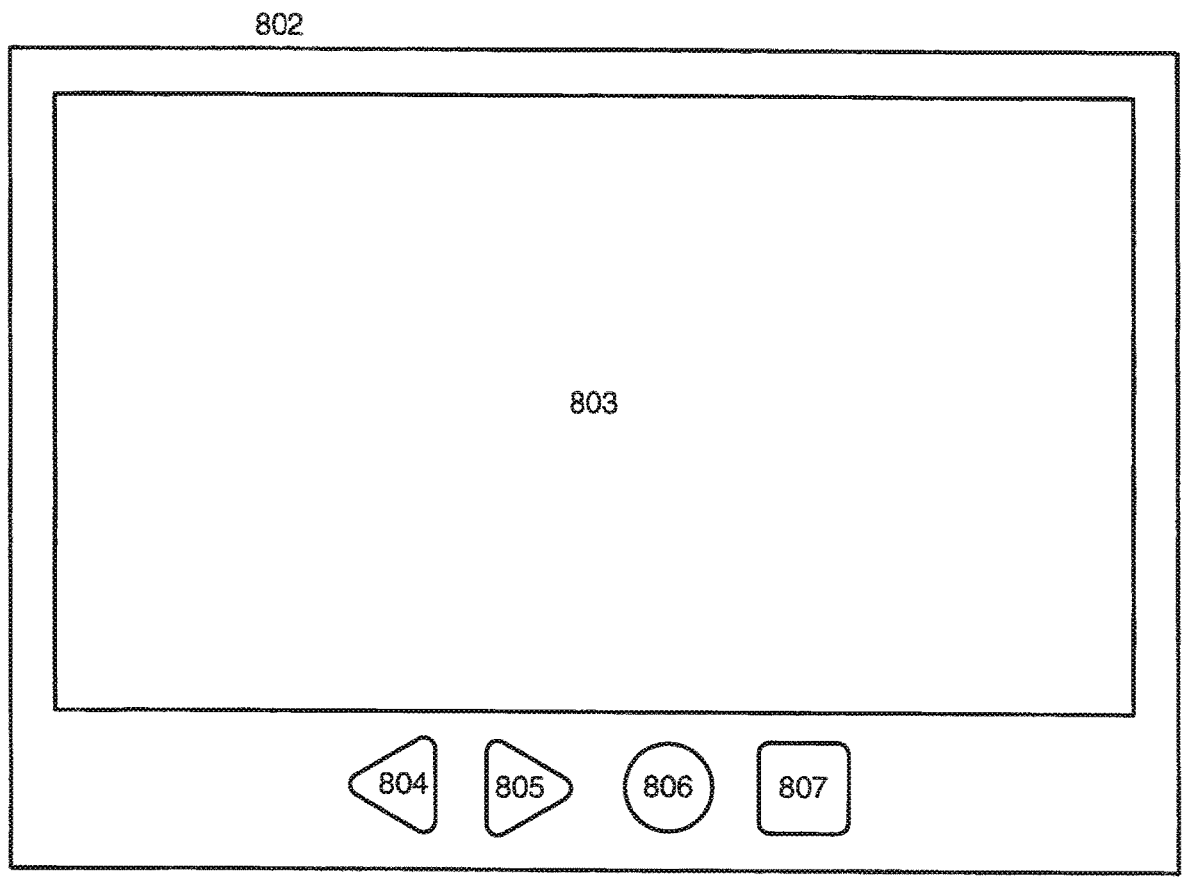
Figure 9C:
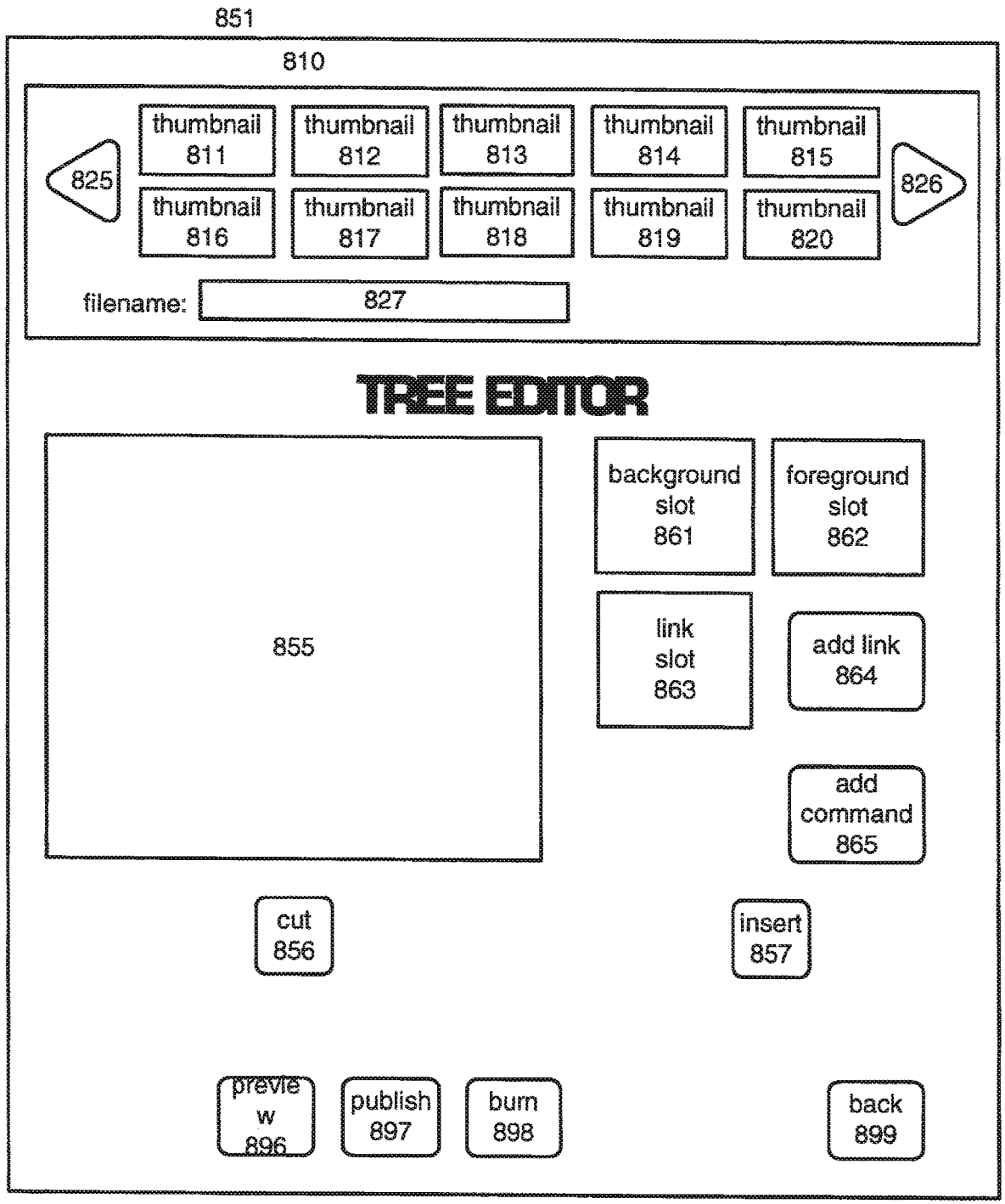

FIG. 9C shows tree editor interface 851. Tree editor interface 851 is generally similar to mash-up editor interface 801; similarities will not be discussed for brevity.

Tree structure window 855 shows a graph of the control structure of the tree playback product being created. Initially, the window is blank, since nothing has been specified.

Figure 9D:
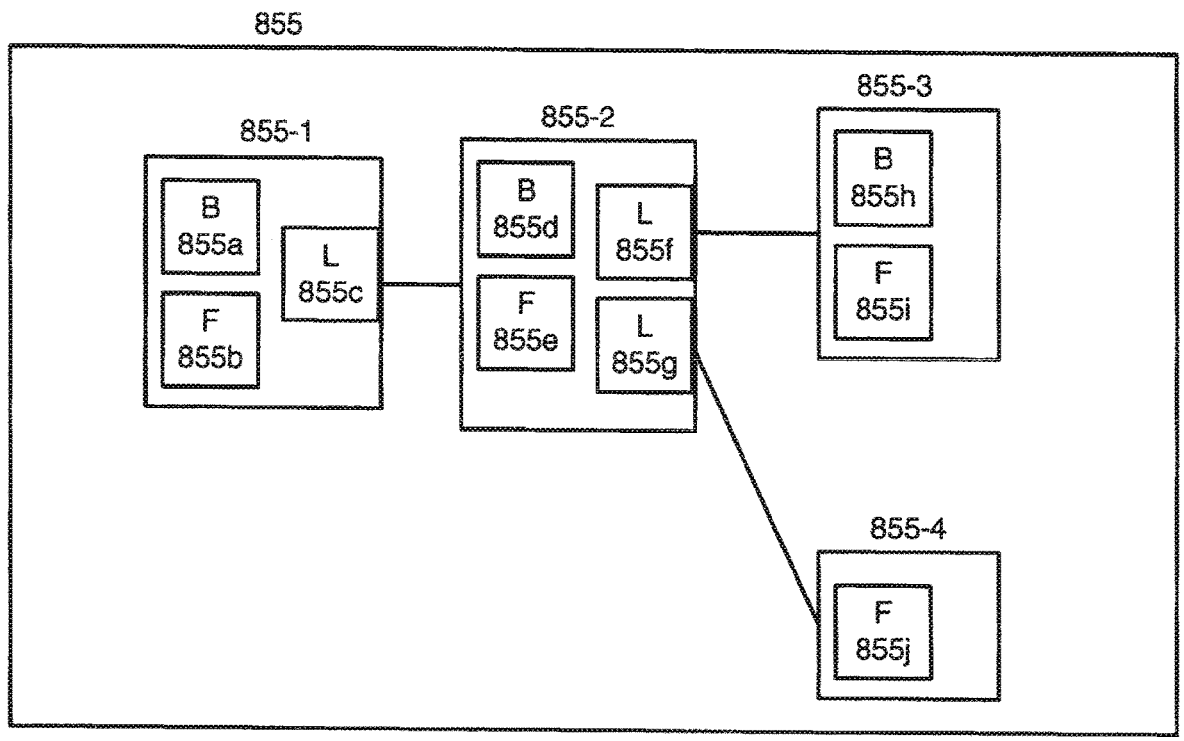

FIG. 9D shows an example of tree structure window 855 after a tree playback product has been created. The tree playback product includes segments 855-1, 855-2, 855-3 and 855-4. Window 855 shows, via lines, the control structure for the navigation between the segments of the playback product. In this example, segment 855-1 leads to segment 855-2 which in turn leads to either of segment 855-3 and 855-4.

Each segment of a tree playback product comprises a background, a foreground and a link. In one embodiment, a background is a still image, a foreground is a video or audio segment, and the link is indicated by a graphic image. When the viewer of the playback product clicks on the link, the viewer is taken to the next segment, that is, a link indicates one segment. Each segment can have 0, 1 or multiple links.

A tree segment can also include 0, 1 or multiple commands. Typically, a command is indicated by a graphic image. When the viewer of the playback product clicks on the command, the command is sent to the source of the playback product, such as server 50, for execution.

Returning to FIG. 9C, to create a segment, the editor drags and drops thumbnails from thumbnail window 810 into at least one of background slot 861, foreground slot 862, and link slot 863. If more links are desired for this segment, the editor clicks add link button 864, and then drags and drops thumbnails into the additional link slots (not shown) created by clicking link button 864. When the user is satisfied, he or she clicks insert button 857 to create a segment.

If a tree playback product segment is created with at least one link, transcoder 40 creates an empty segment as the destination of each link, and displays the empty segment in tree structure window 855. The editor clicks on the empty segment in tree structure window 855 and inserts thumbnails into at least one of the background, foreground and link slots.

If the editor wishes to delete a segment, the editor selects the segment in tree structure window 855, then clicks cut button 856 to remove the segment. Removing a segment automatically removes the link leading to the segment from the preceding segment.

To create a command in a segment, the editor clicks add command button 865. Transcoder 40 provides a pop-up window with a command editor (not shown) that enables the editor to drag and drop a thumbnail indicating the command, select a command from a menu of commands or type the command directly into a command line window (if the editor knows how to write commands in the command language, such as Javascript), and, when appropriate, provide parameters for the command. Examples of commands area (i) a hyperlink to a webpage, (ii) provide the email address of the viewer of the playback product to the owner of the playback product, (iii) provide the email address of the viewer to a third party, (iv) download a program and execute it, and so on.

It will be understood that a thumbnail can be dropped into multiple slots during creation of a tree playback product.

Clicking preview button 896 causes transcoder 40 to create a window similar to that shown in FIG. 9B, however, the tree playback product includes link areas in window 803 that a user can click to navigate between segments.

If a link-up playback product is selected, at step 670, the user selects the sequence of segments to be included via a link-up editor. At step 675, the user defines the link-up structure. At step 680, the user defines the link-up navigation questions and answers. Then, at step 685, the user selects whether the link-up is to be published or burned.

Figure 9F:
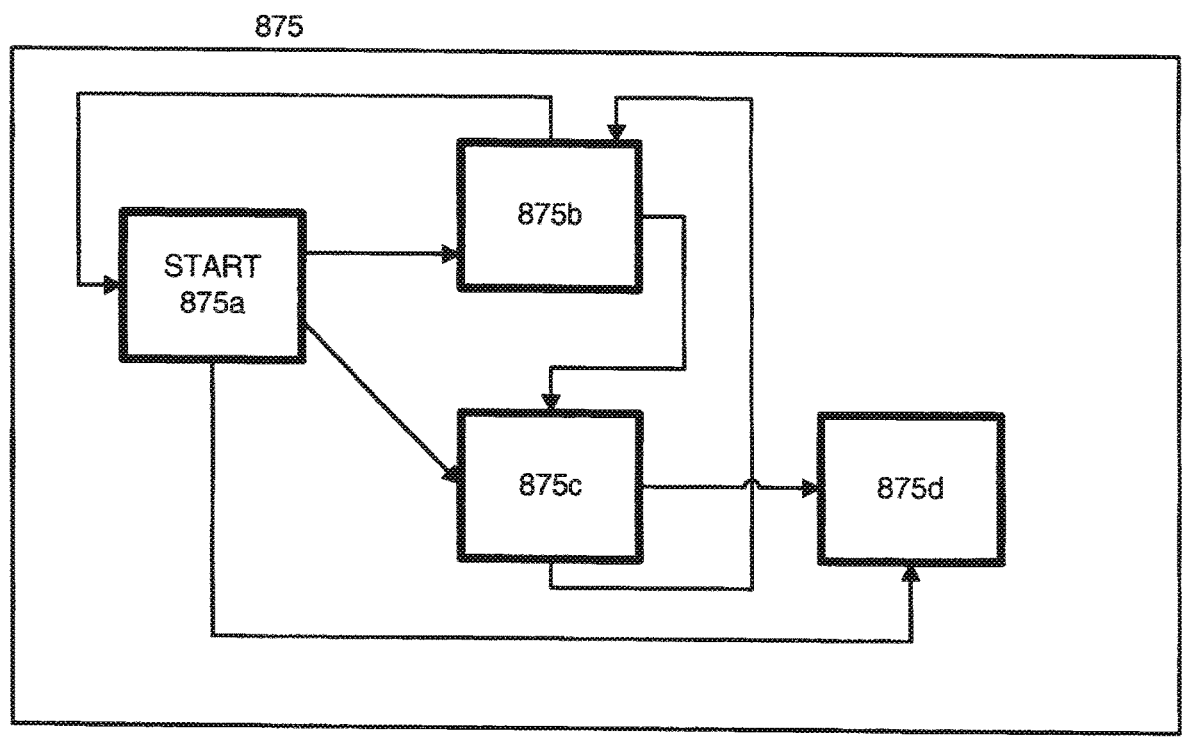
Figure 9E:
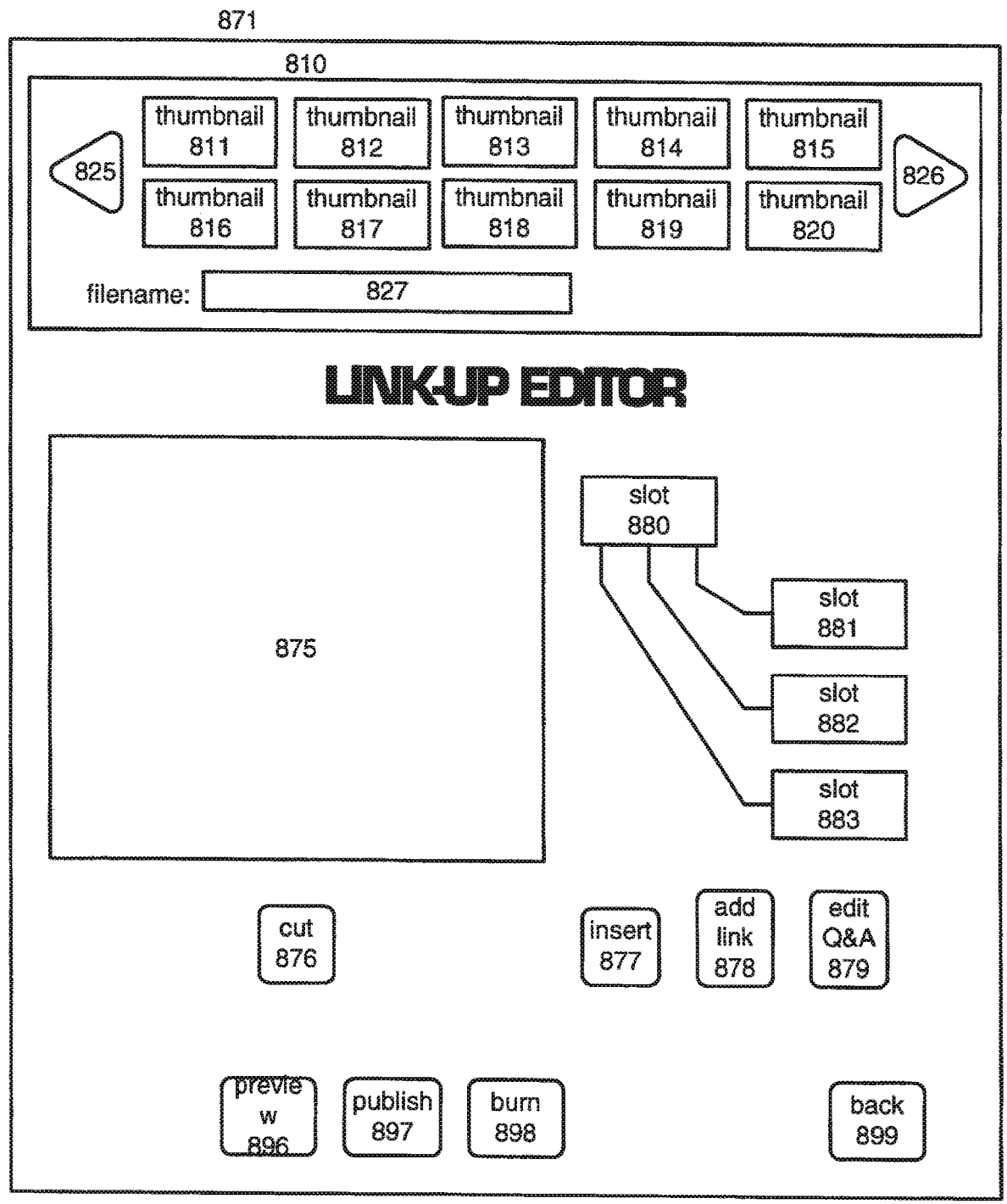

FIG. 9E shows link-up editor interface 871. Link-up editor interface 871 is generally similar to tree editor interface 851; similarities will not be discussed for brevity.

Link-up structure window 875 shows a graph of the control structure of the link-up playback product being created. Initially, the window is blank, since nothing has been specified.

FIG. 9F shows an example of link-up structure window 875 after a link-up playback product has been created. The link-up playback product includes segments 875*a*, 875*b*, 875*c* and 875*d*. Window 875 shows, via lines, the control structure for the navigation between the segments of the playback product. In this example, segment 875*a*, always the first segment to be played during playback, leads to segments 875*b*, 875*c* and 875*d*. Segment 875*b* leads to 875*a* and 875*c*. Segment 875*c* leads to segments 875*b* and 875*d*. Segment 875*d* is sometimes referred to as a final segment, since it is never followed by another segment. Segments 875*b* and 875*c* are sometimes referred to as intermediate segments, since they are not the start segment and they do lead to another segment.

Returning to FIG. 9E, to create the link-up structure, the editor drags and drops thumbnails from thumbnail window 810 into start slot 880 and at least one of intermediate slots 881, 882, 883. If more links are desired for this segment, the editor clicks add link button 878, and then drags and drops thumbnails into the additional slots created by clicking link button 878 (not shown). When the user is satisfied, he or she clicks insert button 877 to create the link-up. Transcoder 40 responds by displaying the link-up in link-up structure window 875, highlights the just-created bit of link-up structure, and freezes the highlight until the editor clicks edit Q&A button 879 to create text associated with the link-up.

A Q&A dialog (not shown), consists of an optional header and a set of choices associated with the respective links. One instance of a Q&A is, Click on the word to indicate what you want to view next:
kitchen
den
basement
garage
backyard Another instance of a Q&A is,
More pictures of actor Alice
More pictures of actor Bob
More pictures of actor Chris Another instance of a Q&A is,
Type (or click on) the number closest to your age:
15
20
25
30

If the editor wishes to delete a segment, the editor selects the segment in link-up structure window 875, then clicks cut button 876 to remove the segment. Removing a segment automatically removes the portion of the Q&A leading to the segment from the preceding segments.

Clicking preview button 896 causes transcoder 40 to create a window similar to that shown in FIG. 9B, however, the link-up playback product includes Q&A areas in window 803 that a viewer can utilize to navigate between segments.

Returning to FIG. 7A, at step 470, transcoder 40 determines whether the user wishes to apply any special effects to the transcoded movie. For example, the user indicates a desire to apply special effects by selecting effects button 775 in FIG. 8. If so, at step 480, transcoder 40 provides the user with an effects editor (discussed below). In some embodiments, there are about 300 different effects on the effects menu. The user selects desired effects and indicates where in the movie they should be applied. At step 490, transcoder 40 applies the effects. Generally, the user views the results of the effects, and continues effects editing until satisfied with the result. The user can create multiple versions of a transcoded movie, differing in their special effects.

Examples of special effects include: watermark, mosaic, barndoor, noise, dissolve, spiral, fade in, fade out, increase contrast, decrease contrast, soften perimeter, cut frame, overlay, and so on.

A movie watermark for a movie including video is one of (a) a permanent graphic such as a logo inserted in each frame of the movie, (b) an overlay graphic such as a logo inserted in each frame of the movie, or (c) hidden information such as a logo, also referred to as steganography. A movie watermark for an audio only movie is (i) a sound file inserted at a predetermined point in the movie, such as its start or end, or (ii) hidden information such as text, also referred to as steganography.

Figure 9G:
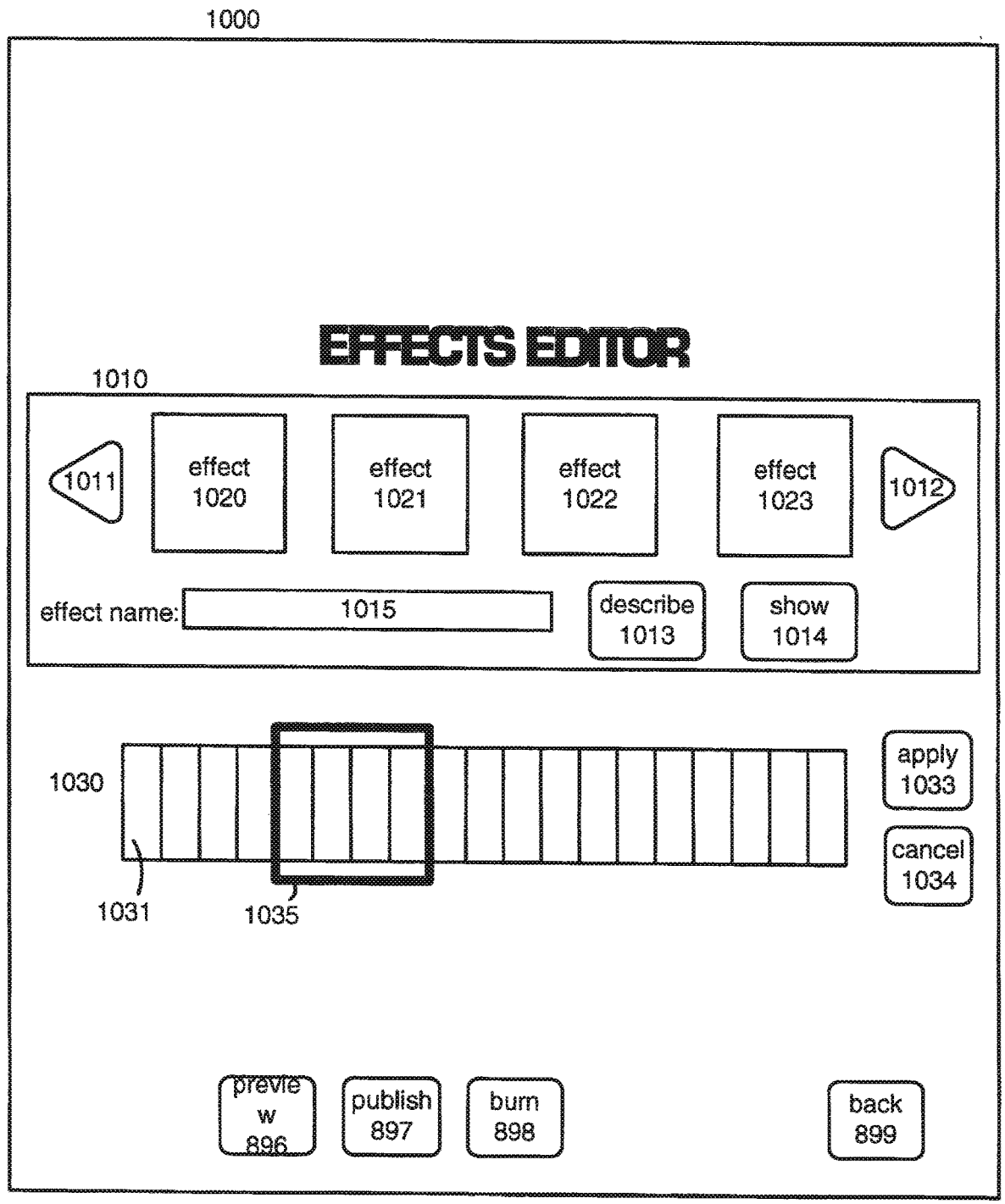

FIG. 9G shows effects editor interface 1000. Effects area 1010 includes effects buttons 1020, 1021, 1022, 1023, indicating which effect is represented by the button. Typically, an effects button has an image of the effect and holding the cursor on the button displays text describing the effect. Forward and reverse navigation buttons 1011, 1012 enable navigation among the effects buttons. Clicking describe button 1013 displays text describing the effect (same as holding the cursor on the button). Clicking show button 1014 creates a pop-up window showing the effect in action, useful when the size of the button is too small to fully convey the effect. Effect name window 1015 enables the editor to type the name of an effect or to select it from a drop-down menu.

An effect can also include an executable command, as described above with respect to the tree playback product editor.

Texture strip 1030 indicates the frame representations of the movie selected for effects, such as frame representation 1031. Slider 1035 has a left and right edge that can be adjusted by the editor, to indicate frames to receive an effect. After the editor selects an effect in effects area 1010, and adjust slider 1035, the editor clicks apply button 1033 to apply the effect. After the editor has finished applying effects, he or she clicks preview button 896 to preview. If an editor wishes to cancel an effect, she positions slider 1035 on the appropriate frame representations and clicks cancel button 1034. Publish button 897, burn button 898, and back button 899 function as described above.

Returning to FIG. 7A, at step 500, transcoder 40 obtains the user's preference for including advertising in the transcoded movie. For example, the user indicates a desire to include advertising by selecting advertising button 780 in FIG. 8. Videobase 20 contains advertising movies, also referred to as ad movies, that is, segments provided by advertisers for inclusion in user-created movies. Database 30 includes the advertiser's preference for the types of movies that the advertiser wants its ad movies to be combined with, whether the advertiser prefers or requires that its ad be used as a static insert or a dynamic insert (discussed below), whether the advertiser permits its ad movies to be used as part of a mash-up video, and how the advertiser pays the user, such as a one-time fee, or per-viewing of the ad movie. Conventional systems place advertising only at the start of user-created content; movie system 10 is more flexible in that advertising can be inserted within a user-created transcoded movie in either a static or a dynamic manner.

If the user wants to include an ad movie in the transcoded movie, at step 510, transcoder 40 determines whether the user wishes to select the ad movie, or to accept an ad movie selected by movie system 10. If the user wishes to select the ad movie, at step 520, transcoder 40 provides the user with a menu of ad movies that are consistent with the characteristics of the user's transcoded movie, and the user selects one or more ad movies for inclusion in their transcoded movie. If the user does not wish to select the ad movies, at step 530, transcoder 40 selects one or more ad movies based on an ad movie selection procedure and its own determination of how many ad movies are appropriate for the transcoded movie. In some embodiments, the ad movie selection procedure is based on maximizing revenue for the user, and following a least-recently-used ad movie selection procedure. In some embodiments, the determination of how many ad movies are appropriate is based on at least one of: the length of the transcoded movie, keywords in the metadata, how many segments are deep tagged, and the length of the deep tagged segments, and so on.

An ad used with movie system 10 can be static or dynamic. A static ad is inserted in the transcoded movie prior to its storage in videobase 20. For a dynamic ad, the transcoded movie is stored in videobase 20 with a placeholder, and when the transcoded movie is presented to a user, the actual ad is inserted, the ad being chosen based on a characteristic of the user such as the user's location, referred to as a "geo-aware" ad, the characteristics of the display device, referred to as a "device aware" ad, or other suitable characteristic.

At step 540, transcoder 40 determines whether the user wishes to control the position of the ad movie(s) within a frame of the transcoded movie, or to accept positioning determined by movie system 10. If the user wishes to control the positioning of the ad movie, at step 550, transcoder 40 provides the user with a graphical interface for controlling ad movie positioning, and a menu of how the ad-movie should be inserted, such as a picture-in-picture at the top, left, right or bottom of the transcoded movie, the top being referred to as a "banner" ad, or as a stand-alone segment in the transcoded movie. In some embodiments, the user selects the size of the space in each frame that the ad may occupy. If the user does not wish to control the positioning of the ad movie, at step 560, transcoder 40 decides where the movie ad should be placed, typically by looking at the default position in the metadata associated with the ad movie.

At step 570, transcoder 40 determines whether the user wishes to control the frames of the transcoded movie where the ad will be placed, or to accept positioning determined by movie system 10. If the user wishes to control the positioning of the ad movie, at step 580, transcoder 40 provides the user with a graphical interface for controlling ad movie positioning, such as a texture strip and slider. If the user does not wish to control the positioning of the ad movie, at step 590, transcoder 40 estimates where the movie ad should be placed. Any suitable estimation procedure may be employed. As an example, if the transcoded movie is a completely new movie with no deep tags, the estimation procedure specifies that the first scene having a length of at least the length of the ad movie is the selected position, and that the ad movie should be inserted as a picture-in-picture in the lower right of the transcoded movie. However, if the transcoded movie is associated with at least one other user, then a popularity procedure is used to select the position for the ad movie.

Figure 10:
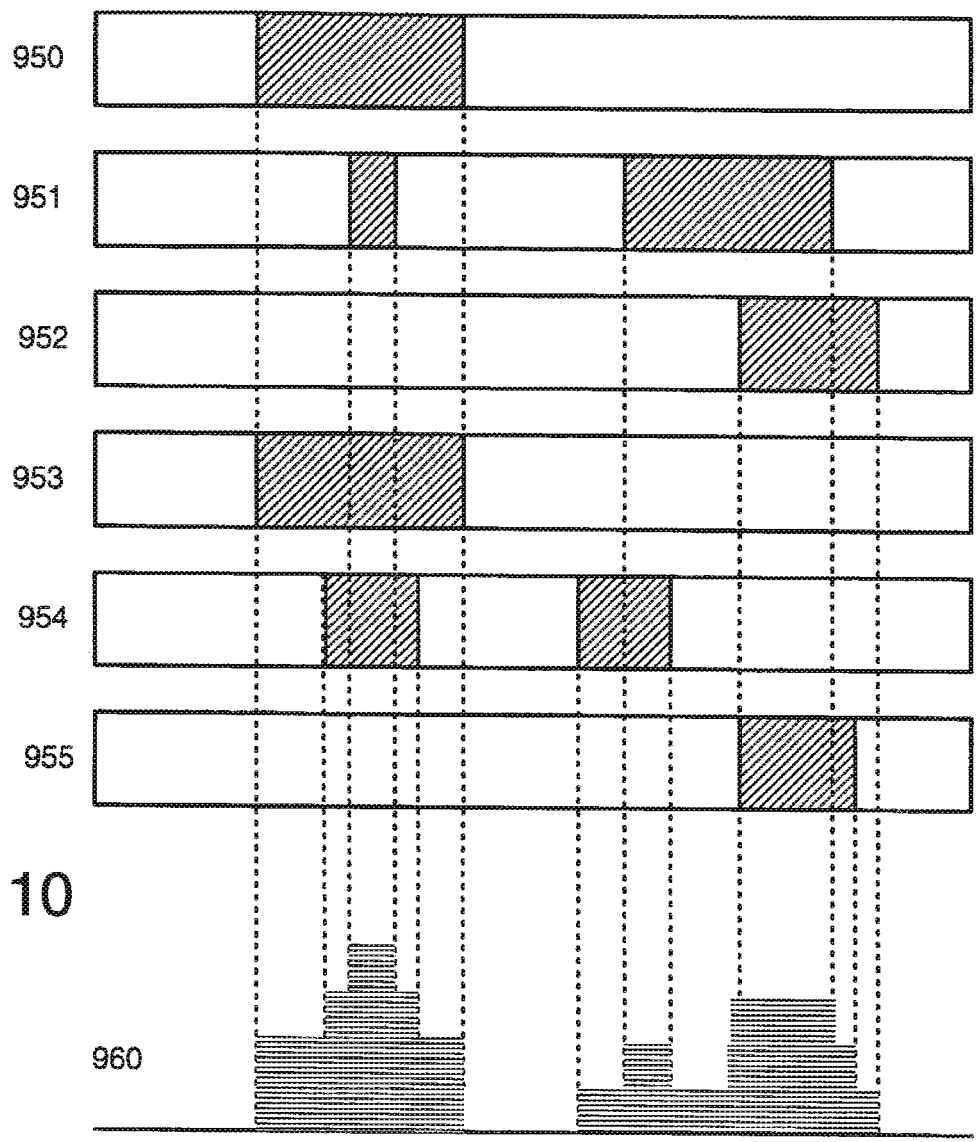
FIG. 10 is a diagram illustrating automatic determination of popular parts of a movie.

FIG. 10 is a diagram illustrating automatic determination of popular parts of a movie. Horizontal bars 950-955 represent the same movie, as deep tagged by different users.

Histogram 960, also referred to as popularity density function 960, indicates the number of times that a portion of the movie has appeared in a deep tag, which serves as an indication of the popularity of the various parts of the movie. Movie ads are placed in the popular parts, if they are long enough, or with respect to the popular parts, if the popular parts are shorter than the ad movie. For example, the movie ad could be placed so that its start is co-located with the start of a popular segment having a duration of at least 70% of the duration of the ad movie.

At step 600 of FIG. 7A, transcoder 40 inserts the selected movie ads into the transcoded movie.

Figure 9H:
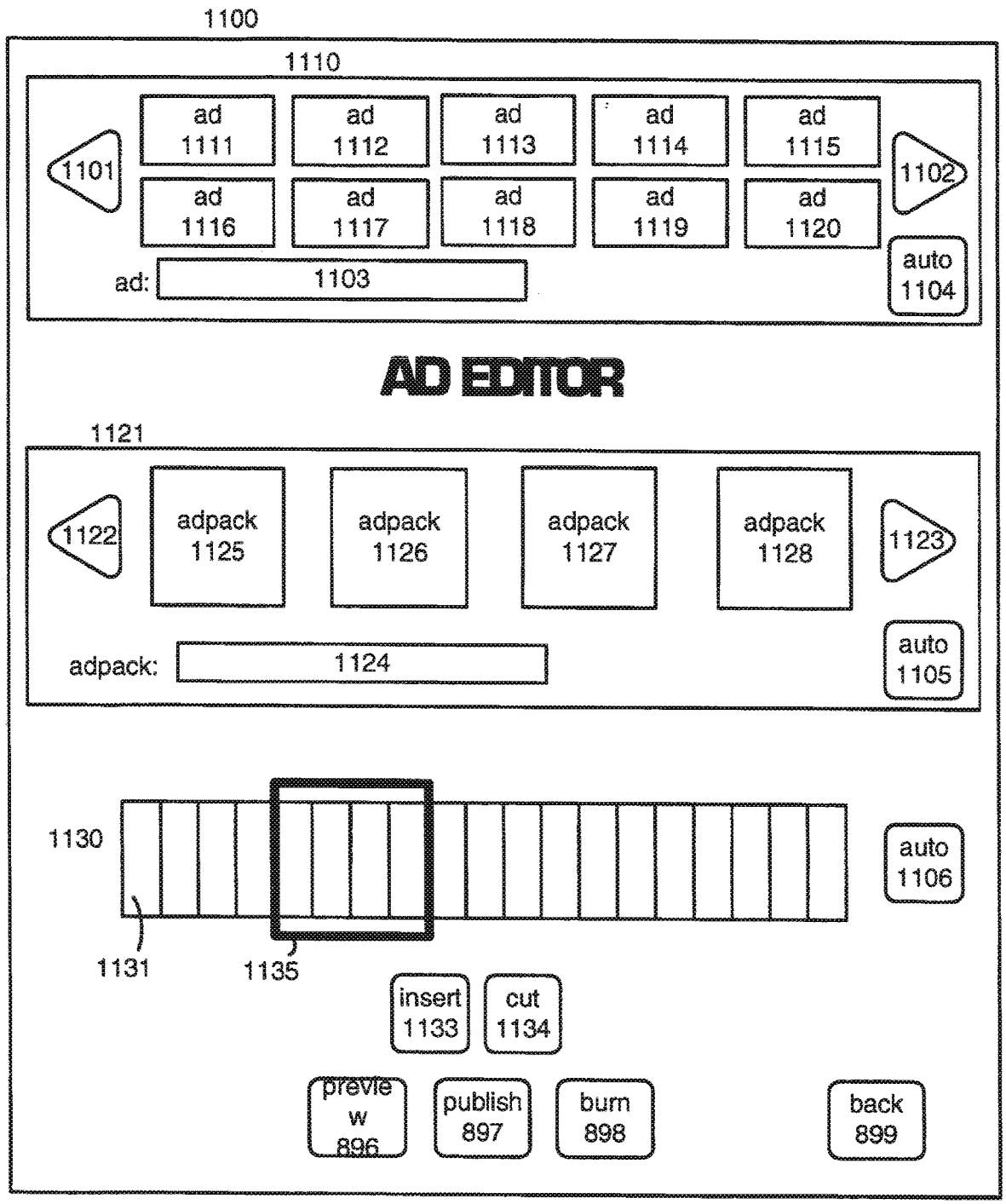

FIG. 9H shows ad editor interface 1100 having ad area 1110, adpack area 1121 and texture strip 1130.

Ad area 1110 includes ad thumbnail windows 1111-1120 and navigation buttons 1101, 1102 for altering which thumbnails of the ad thumbnails in videobase 20 are displayed in area 1110. Filename entry window 1103 enables a user to type in the name of an ad file, or select an ad filename from a directory, which puts the file's thumbnail in ad thumbnail window 1111. Ad area 1110 also includes automatic button 1104, for indicating that movie system 10 should select an ad.

An adpack is a pairing of an ad movie and an adpack description. An adpack description controls how the ad movie will be displayed in the transcoded movie. Examples of adpack descriptions are:

Ad image at frame bottom
Ad image at frame bottom, fade in and fade out
Ad image slides from left to right in succeeding frames
Ad audio plays when frames are viewed
Ad video at frame top
Ad video at frame bottom
Ad video in frame left
Ad video in frame right The International Advertising Bureau has defined standard ad display areas, and these may be used as adpack descriptions; see, for example, http://www.iab.net/standards/popup/index.asp.

An adpack can also include one or more executable commands, as described above with respect to the tree playback product editor. The provider of an ad movie typically specifies certain adpacks as selectable for its ad movie, and configures the commands to be associated with its ad movie. Examples of commands are: (i) a hyperlink to the ad provider's web site, (ii) sending the email address of the viewer of the transcoded movie to the ad provider, and (iii) requesting a file download from the ad provider to the viewer of the transcoded movie; other commands are also contemplated.

Adpack area 1121 includes adpack description windows 1125-1128 and navigation buttons 1122, 1123 for altering which adpack descriptions are displayed in area 1121. Filename entry window 1124 enables a user to type in the name of an adpack, or select an adpack from a directory, which puts the adpack in adpack description window 1125. Adpack area 1121 also includes automatic button 1105, for indicating that movie system 10 should select the placement of the ad in the frame.

Texture strip 1130 includes frame representations of the movie being edited, such as frame representation 1131. Slider 1135 indicates frame representations in the texture strip; the editor can adjust the left and right edges of slider 1135. Automatic button 1106 is used when the editor wishes to indicate that movie system 10 should select the frames in which the ad is placed.

To manually insert an ad, the editor selects an ad, such as by clicking ad thumbnail 1117, then selects an adpack description to control where in the frame the ad is placed, such as by clicking adpack description 1127, then adjusts slider 1135 to indicate which frames the ad is placed in, then clicks insert button 1133.

To instruct movie system 10 to select an ad and put it in the movie being edited, the editor clicks automatic buttons 1104, 1105 and 1106.

To remove an ad, the editor adjust slider 1135 then clicks cut button 1134.

Buttons 896, 897, 898, 899 function as described above.

Returning to FIG. 7A, at step 610, transcoder 40 determines whether the user wishes to share the transcoded movie, or segments thereof. For example, the user indicates a desire to share by selecting share button 790 in FIG. 8. If so, at step 620, the user identifies segments by deep tagging them, or using previously defined deep tags. At step 630, the user identifies who is permitted to access which segments. In some embodiments, when a user registers with movie system 10, the user can create access groups having one or more outside users in each group; the same outside user can be included in one or more access groups. An outside user is generally identified by a nickname and an email address. Then, the user instructs transcoder 40 when to make the access permissions effective, typically by sending an email to the outside users identifying the segment address, and its short text description. The segment address is of the form: (server 50 address, transcoded movie identifier, deep tag identifier). In some embodiments, the user can, as part of sharing, list the transcoded movie in a directory accessible to other users of movie system 10, searchable by characteristics of the transcoded movie, such as its metadata subject keywords, its creation time, and/or its ads.

Figure 11:
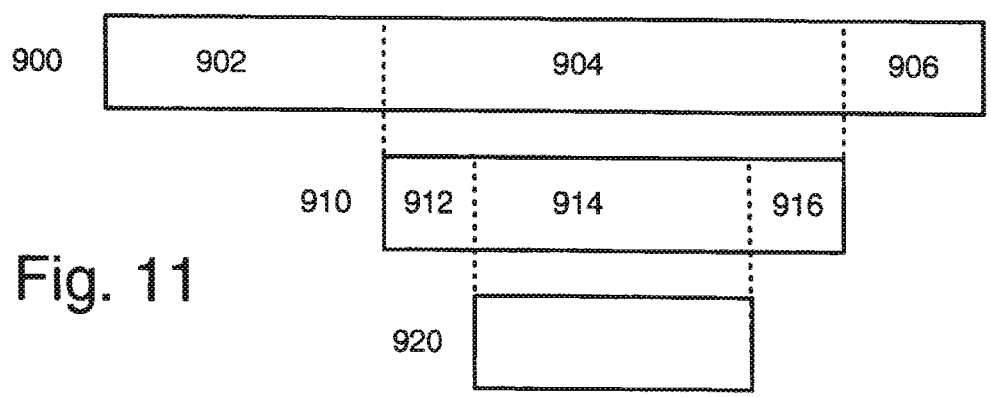
FIG. 11 is a diagram illustrating access permission for a movie.

FIG. 11 is a diagram illustrating access permission for a movie. Let it be assumed that the owner of movie 900, user1, defines a deep tag indicating segment 904 of movie 900, and permits an outside user, user2, to access segment 904. Now, in movie 900, segments 902 and 906 are private segments, while segment 904 is a shared segment.

User2 sees segment 904 as movie 910. User2 can define a deep tag indicating segment 914 of movie 910, and permit an outside user, user3, to access segment 914. Now, in movie 910, segments 912 and 916 are private to user2, while segment 914 is shared.

User3 sees segment 914 as movie 920, and can similarly enable access to all or parts of movie 920.

The transcoded movie is then stored in videobase 20, and database 30 is suitably updated.

A use case will now be discussed.

Let it be assumed that a user uploads three files (FIG. 7, step 400). The first file is a DVD file in MPEG2 format. The second file is a webcam file in MPEG4 format. The third file is a mobile phone camera recording in 3GP format. At this time, the MPEG2, MPEG4 and 3GP formats are considered incompatible.

Movie system 10 converts each of these three files to proxy files in H.263 Flash format (FIG. 7, step 420). Let it be assumed that each of the proxy files has 100 frames, and have the filenames:

Proxy-1200
Proxy-1201
Proxy-1202

Now the user creates a mash-up (FIG. 7, step 450) using the mash-up editor (FIG. 9A). Transcoder 40 represents the mash-up as a list of the proxy files and the start and end frames of each proxy file:

Proxy-1200, start 22, end 27
Proxy-1201, start 84, end 86
Proxy-1202, start 62, end 70

Next, the user adds special effects (FIG. 7, step 480) using the effects editor (FIG. 9G). Let it be assumed that one special effect is a watermark (effect 45) comprising an image in the user's file proxy-678, and another special effect is a dissolve (effect 18) between the seventh to ninth frames of the mash-up. Transcoder 40 represents the result as:

Proxy-1200, start 22, end 27
Proxy-1201, start 84, end 86
Proxy-1202, start 62, end 70
Effect 45, proxy-678
Effect 18, start 7, end 9

Finally, the user inserts two ads, allowing the system to automatically choose the ads and their placement (FIG. 7, steps 530, 560, 590) using the ad editor (FIG. 9H).

Transcoder 40 represents the result as:
Proxy-1200, start 22, end 27
Proxy-1201, start 84, end 86
Proxy-1202, start 62, end 70
Effect 45, proxy-678
Effect 18, start 7, end 9
Ad 4511268, adpack 2, start 3, end 6
Ad 3897522, adpack 163, start 11, end 16

Figure 12:
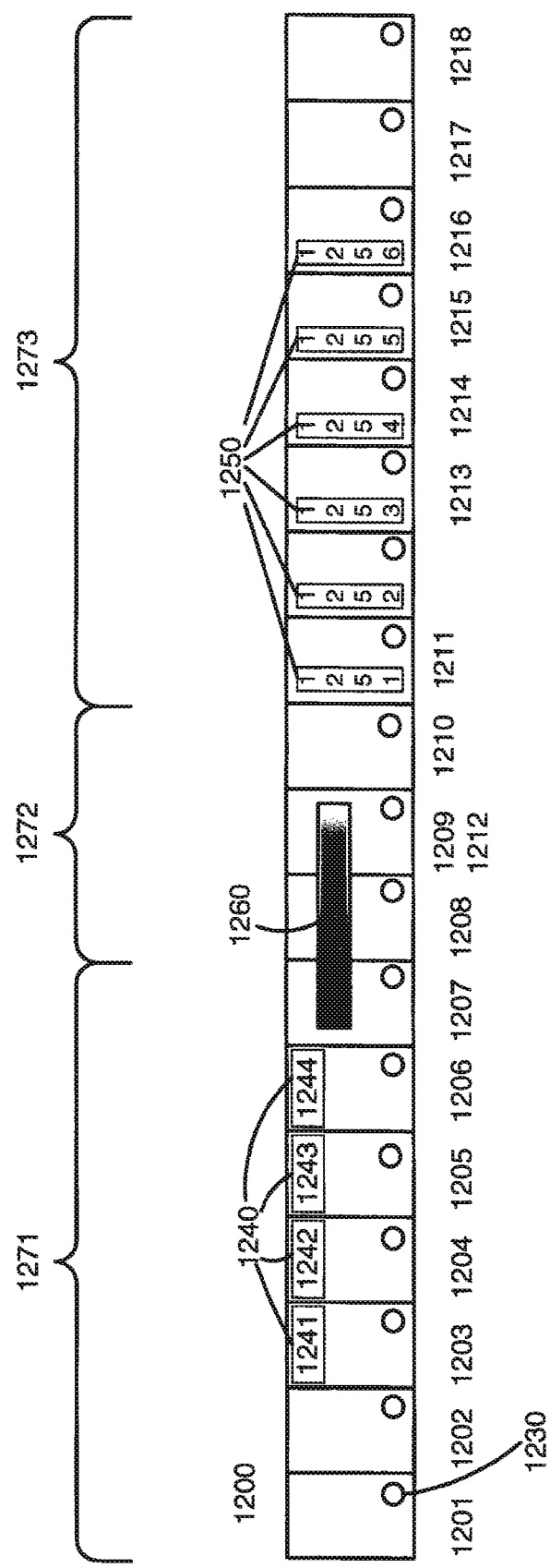
FIG. 12 is a diagram illustrating a transcoded movie.

FIG. 12 shows the texture strip resulting from this use case. Texture strip 1200 comprises frame representations 1201-1218. As indicated by bracket 1271, frame representations 1201-1207 are from file Proxy-1200. As indicated by bracket 1272, frame representations 1208-1210 are from file Proxy-1201. As indicated by bracket 1273, frame representations 1211-1218 are from file Proxy-1202. Watermark 1230, the logo in file proxy-678, is present in the bottom right of each frame, as depicted in each of the frame representations. Dissolve special effect 1260 is present in frame representations 1207-1209. First ad 1240, having frame representations 1241-1244, in present as a top banner in frames 1203-1206. Second ad 1250, having frame representations 1251-1256, is present as a side banner in frames 1211-1216.

It will be appreciated that some editing functions can be accomplished in several ways. For example, if the user wishes to delete a frame from the movie, this can be accomplished via (1) creating a mash-up comprising the frames before the deleted frame, followed by the frames after the deleted frame, and not including the deleted frame; (2) adding a special effect to cause the deleted frame to be entirely dark or entirely light, as part of a scene transition; (3) directly selecting "delete frame" from the special effects menu; (3) enabling sharing of the entirety of the movie except for the to-be-deleted frame; and so on.

Figure 13:
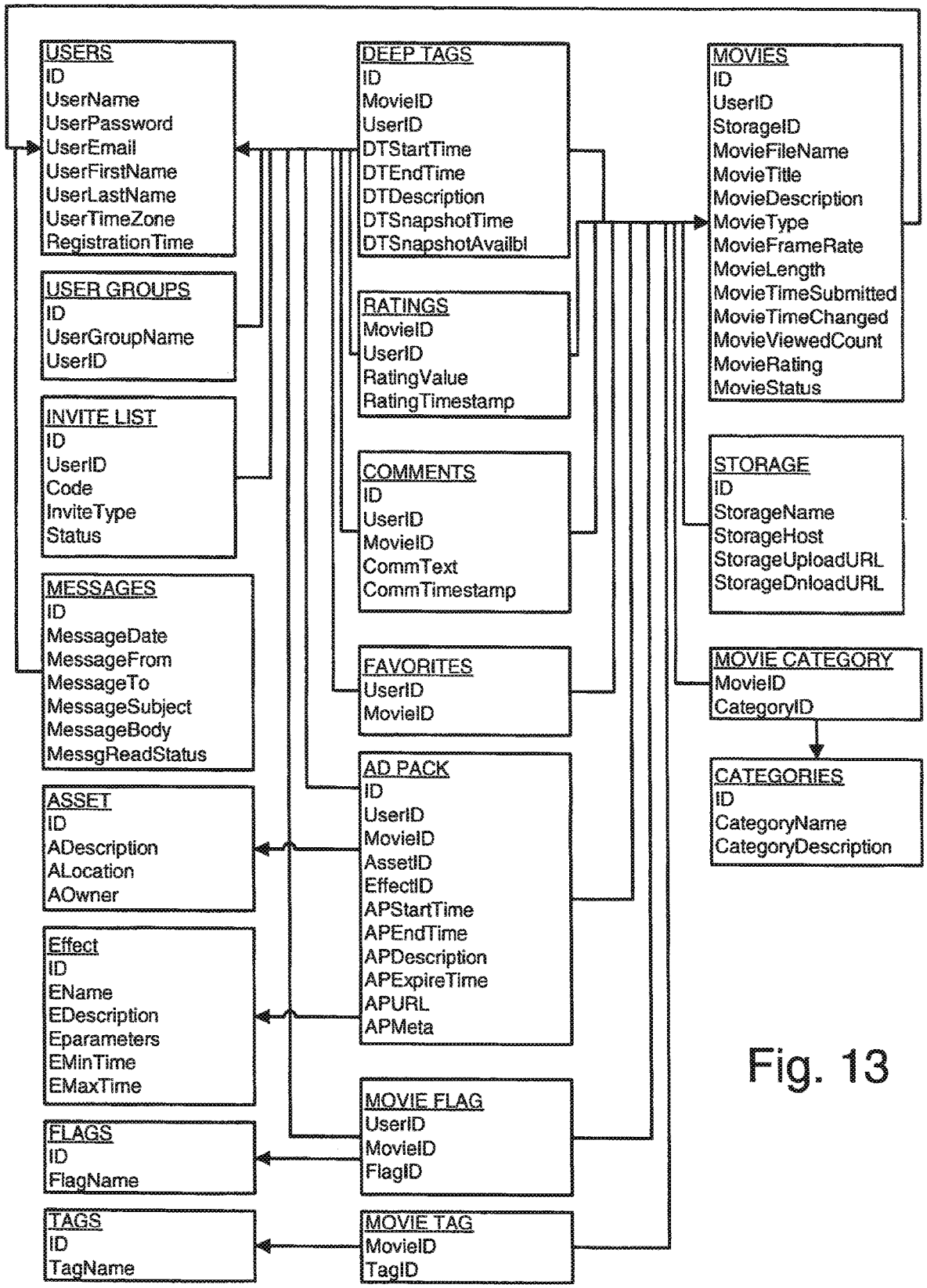
FIG. 13 is a data schema used in the present invention.

FIG. 13 is a partial data schema for database 30. Generally, database 30 can be viewed by users or by movies having appropriate access permission. The schema is structured in accordance with usage of movie system 10.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for video content insertion, the method comprising:
   receiving, by a transcoder executing on a processor, a video in a source digital format;
   converting, by the transcoder, the video in the source digital format into a series of uncompressed frames in a transcoded format;
   creating, by the transcoder according to a video compression standard, a source proxy having proxy frames in a source proxy format, the proxy frames representing the series of uncompressed frames in the transcoded format;
   receiving, by the transcoder, user input via a graphical user interface, the user input including edits applied to the proxy frames over a texture strip, the edits indicating:
      a location within a frame of the series of uncompressed frames in the transcoded format for content insertion, and
      a plurality of frames in the series of uncompressed frames for content insertion;
   determining, by the transcoder, whether to perform the content insertion as a dynamic insert or a static insert; and
   depending upon the determining, inserting static content or, for the dynamic insert, a placeholder at the location within each frame of the plurality of frames in the transcoded format, wherein either the static content or the placeholder is stored with the series of uncompressed frames in the transcoded format in a content repository, and wherein the placeholder is used to insert dynamic content at the location within each frame of the plurality of frames during play of the video.

2. The method according to claim 1, wherein the video comprises a user-created video and wherein the content comprises an advertisement video.

3. The method according to claim 1, further comprising:
   providing, by the transcoder via the graphical user interface, a user with a menu of advertisement videos that are consistent with characteristics of the video in the source digital format, wherein the static content is one of the advertisement videos selected by the user via the menu of advertisement videos.

4. The method according to claim 1, further comprising:
   selecting, by the transcoder, one or more advertisement videos based on at least one of: a length of the series of uncompressed frames in the transcoded format, keywords in metadata describing the video in the source digital format, a number of segments in the video in the source digital format that have been deep tagged, or a length of a deep tagged segment.

5. The method according to claim 1, further comprising:
   providing, by the transcoder via the graphical user interface, a menu including the texture strip and slider for controlling content insertion positioning.

6. The method according to claim 1, further comprising:
   selecting the dynamic content based on at least one of: a characteristic of a user for which to play the video on a user device or a characteristic of the user device.

7. The method according to claim 6, wherein the characteristic of the user comprises a location of the user and wherein the dynamic content comprises a geo-aware advertisement video in view of the location of the user.

8. A system for video content insertion, the system comprising:
   a processor;
   a non-transitory computer-readable medium; and
   stored instructions translatable by the processor to cause a transcoder to perform:

receiving a video in a source digital format;
converting the video in the source digital format into a series of uncompressed frames in a transcoded format;
creating, according to a video compression standard, a source proxy having proxy frames in a source proxy format, the proxy frames representing the series of uncompressed frames in the transcoded format;
receiving user input via a graphical user interface, the user input including edits applied to the proxy frames over a texture strip, the edits indicating:
 a location within a frame of the series of uncompressed frames in the transcoded format for content insertion, and
 a plurality of frames in the series of uncompressed frames for content insertion;
determining whether to perform the content insertion as a dynamic insert or a static insert; and
depending upon the determining, inserting static content or, for the dynamic insert, a placeholder at the location within each frame of the plurality of frames in the transcoded format, wherein either the static content or the placeholder is stored with the series of uncompressed frames in the transcoded format in a content repository, and wherein the placeholder is used to insert dynamic content at the location within each frame of the plurality of frames during play of the video.

9. The system of claim 8, wherein the video comprises a user-created video and wherein the content comprises an advertisement video.

10. The system of claim 8, wherein the stored instructions are further translatable by the processor to cause the transcoder to perform:
 providing, via the graphical user interface, a user with a menu of advertisement videos that are consistent with characteristics of the video in the source digital format, wherein the static content is one of the advertisement videos selected by the user via the menu of advertisement videos.

11. The system of claim 8, wherein the stored instructions are further translatable by the processor to cause the transcoder to perform:
 selecting one or more advertisement videos based on at least one of: a length of the series of uncompressed frames in the transcoded format, keywords in metadata describing the video in the source digital format, a number of segments in the video in the source digital format that have been deep tagged, or a length of a deep tagged segment.

12. The system of claim 8, wherein the stored instructions are further translatable by the processor to cause the transcoder to perform:
 providing, via the graphical user interface, a menu including the texture strip and slider for controlling content insertion positioning.

13. The system of claim 8, wherein the stored instructions are further translatable by the processor to cause the transcoder to perform:
 selecting the dynamic content based on at least one of: a characteristic of a user for which to play the video on a user device or a characteristic of the user device.

14. The system of claim 13, wherein the characteristic of the user comprises a location of the user and wherein the dynamic content comprises a geo-aware advertisement video in view of the location of the user.

15. A computer program product for video content insertion, the computer program product comprising a non-transitory computer-readable medium storing instructions translatable by a processor to cause a transcoder to perform:
 receiving a video in a source digital format;
 converting the video in the source digital format into a series of uncompressed frames in a transcoded format;
 creating, according to a video compression standard, a source proxy having proxy frames in a source proxy format, the proxy frames representing the series of uncompressed frames in the transcoded format;
 receiving user input via a graphical user interface, the user input including edits applied to the proxy frames over a texture strip, the edits indicating:
  a location within a frame of the series of uncompressed frames in the transcoded format for content insertion, and
  a plurality of frames in the series of uncompressed frames for content insertion;
 determining whether to perform the content insertion as a dynamic insert or a static insert; and
 depending upon the determining, inserting static content or, for the dynamic insert, a placeholder at the location within each frame of the plurality of frames in the transcoded format, wherein either the static content or the placeholder is stored with the series of uncompressed frames in the transcoded format in a content repository, and wherein the placeholder is used to insert dynamic content at the location within each frame of the plurality of frames during play of the video.

16. The computer program product of claim 15, wherein the video comprises a user-created video and wherein the content comprises an advertisement video.

17. The computer program product of claim 15, wherein the instructions are further translatable by the processor to cause the transcoder to perform:
 providing, via the graphical user interface, a user with a menu of advertisement videos that are consistent with characteristics of the video in the source digital format, wherein the static content is one of the advertisement videos selected by the user via the menu of advertisement videos.

18. The computer program product of claim 15, wherein the instructions are further translatable by the processor to cause the transcoder to perform:
 selecting one or more advertisement videos based on at least one of: a length of the series of uncompressed frames in the transcoded format, keywords in metadata describing the video in the source digital format, a number of segments in the video in the source digital format that have been deep tagged, or a length of a deep tagged segment.

19. The computer program product of claim 15, wherein the instructions are further translatable by the processor to cause the transcoder to perform:
 providing, via the graphical user interface, a menu including the texture strip and slider for controlling content insertion positioning.

20. The computer program product of claim 15, wherein the instructions are further translatable by the processor to cause the transcoder to perform:
 selecting the dynamic content based on at least one of: a characteristic of a user for which to play the video on a user device or a characteristic of the user device, wherein the characteristic of the user comprises a location of the user, and wherein the dynamic content comprises a geo-aware advertisement video in view of the location of the user.

\* \* \* \* \*